United States Patent
Pallardy et al.

(10) Patent No.: US 11,829,188 B2
(45) Date of Patent: Nov. 28, 2023

(54) METHOD FOR MANAGING THE DEBUGGING OF A SYSTEM ON CHIP FORMING FOR EXAMPLE A MICROCONTROLLER, AND CORRESPONDING SYSTEM ON CHIP

(71) Applicants: STMicroelectronics (Rousset) SAS, Rousset (FR); STMicroelectronics (Alps) SAS, Grenoble (FR); STMicroelectronics (Grand Ouest) SAS, Le Mans (FR)

(72) Inventors: Loic Pallardy, Rouillon (FR); Nicolas Anquet, Grenoble (FR); Dragos Davidescu, Lambesc (FR)

(73) Assignees: STMicroelectronics (Rousset) SAS, Rousset (FR); STMicroelectronics (Alps) SAS, Grenoble (FR); STMicroelectronics (Grand Ouest) SAS, Le Mans (FR)

( * ) Notice: Subject to any disclaimer, the term of this patent is extended or adjusted under 35 U.S.C. 154(b) by 442 days.

(21) Appl. No.: 16/953,993

(22) Filed: Nov. 20, 2020

(65) Prior Publication Data

US 2021/0157668 A1 May 27, 2021

(30) Foreign Application Priority Data

Nov. 22, 2019 (FR) .................................. 1913127

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0721* (2013.01); *G06F 11/3656* (2013.01);
(Continued)

(58) Field of Classification Search
CPC ............ G06F 11/0751; G06F 11/0721; G06F 11/3656
(Continued)

(56) References Cited

U.S. PATENT DOCUMENTS 5,919,255 A * 7/1999 Seshan .................. G06F 9/4812
710/265
6,145,041 A * 11/2000 Chambers ........... G06F 13/4226
710/110
(Continued)

FOREIGN PATENT DOCUMENTS

BR  112013025855 B1  8/2021
EP     2521345 A2    11/2012
(Continued)

OTHER PUBLICATIONS

Gerstlauer, A., "EE382V System-on-a-Chip (SoC) Design," Lecture 12—SoC Communication Architectures, University of Texas at Austin, © 2014 A. Gerstlauer, 43 pages.
(Continued)

*Primary Examiner* — Sarai E Butler
(74) *Attorney, Agent, or Firm* — Slater Matsil, LLP

(57) ABSTRACT

In an embodiment a system on chip includes a plurality of microprocessors, a plurality of slave resources, an interconnection circuit coupled between the microprocessors and the slave resources, the interconnection circuit configured to route transactions between the microprocessors and the slave resources and a processing controller configured to allow a user of the system to implement within the system at least one configuration diagram of the system defined by a set of configuration pieces of information used to define an assignment of at least one microprocessor to at least some of the slave resources, select the at least one microprocessors, and authorise an external debugging tool to access, for
(Continued)

debugging purposes, only the slave resources assigned to the at least one microprocessor.

20 Claims, 13 Drawing Sheets

(51) Int. Cl.
*G06F 13/42* (2006.01)
*G06F 21/44* (2013.01)
*G06F 11/36* (2006.01)

(52) U.S. Cl.
CPC .......... *G06F 13/4282* (2013.01); *G06F 21/44* (2013.01); *G06F 2213/0016* (2013.01); *G06F 2213/0038* (2013.01)

(58) Field of Classification Search
USPC ....................................................... 714/1–57
See application file for complete search history.

(56) References Cited

U.S. PATENT DOCUMENTS

| | | | |
|---|---|---|---|
| 6,546,496 B1 | 4/2003 | Wang et al. | |
| 7,228,440 B1* | 6/2007 | Giles | G01R 31/31719 713/168 |
| 7,353,259 B1* | 4/2008 | Bakke | G06F 11/2028 714/4.11 |
| 7,870,455 B2* | 1/2011 | Mayer | G06F 11/0724 714/37 |
| 9,091,727 B1 | 7/2015 | Lupu et al. | |
| 9,143,392 B2 | 9/2015 | Duchesneau | |
| 9,703,944 B2 | 7/2017 | Hopkins et al. | |
| 9,946,674 B2 | 4/2018 | Mayer et al. | |
| 10,176,131 B1 | 1/2019 | Arbel | |
| 10,372,883 B2 | 8/2019 | Hurst et al. | |
| 10,983,937 B2 | 4/2021 | Ferrand et al. | |
| 11,050,570 B1 | 6/2021 | Totah et al. | |
| 11,088,876 B1 | 8/2021 | Farjadrad | |
| 11,112,418 B1 | 9/2021 | Holmes et al. | |
| 11,144,235 B1 | 10/2021 | Lyons et al. | |
| 11,175,839 B1 | 11/2021 | Volpe et al. | |
| 11,182,110 B1 | 11/2021 | Ansari et al. | |
| 11,308,573 B2 | 4/2022 | Nystad et al. | |
| 2002/0083387 A1* | 6/2002 | Miner | G01R 31/318552 714/E11.16 |
| 2003/0108030 A1 | 6/2003 | Gao | |
| 2004/0064757 A1* | 4/2004 | Jahnke | G06F 11/2242 714/37 |
| 2004/0158784 A1* | 8/2004 | Abuhamdeh | G01R 31/318555 714/724 |
| 2004/0216080 A1* | 10/2004 | Roesner | G06F 30/33 713/1 |
| 2005/0188248 A1* | 8/2005 | O'Brien | G06F 3/0619 711/170 |
| 2005/0235281 A1 | 10/2005 | Lefrancois | |
| 2006/0174163 A1* | 8/2006 | Gravoille | G06F 11/3648 714/E11.207 |
| 2006/0193273 A1 | 8/2006 | Passier et al. | |
| 2006/0239692 A1* | 10/2006 | Lee | H04L 1/0052 398/140 |
| 2007/0116023 A1 | 5/2007 | Tatapudi et al. | |
| 2007/0182445 A1 | 8/2007 | Chen et al. | |
| 2008/0123423 A1 | 5/2008 | Kim | |
| 2008/0183305 A1 | 7/2008 | Foster et al. | |
| 2008/0204089 A1 | 8/2008 | Nakasha | |
| 2009/0324764 A1 | 12/2009 | Sekihara et al. | |
| 2010/0067507 A1 | 3/2010 | Park | |
| 2011/0016310 A1 | 1/2011 | Yong | |
| 2011/0016338 A1* | 1/2011 | Williamson | G06F 9/3891 712/228 |
| 2012/0030730 A1 | 2/2012 | Smith et al. | |
| 2012/0079590 A1 | 3/2012 | Sastry et al. | |
| 2012/0239895 A1 | 9/2012 | Zbiciak et al. | |
| 2012/0266230 A1 | 10/2012 | Vanderpol et al. | |
| 2013/0059576 A1 | 3/2013 | Park et al. | |
| 2013/0151829 A1 | 6/2013 | Amann et al. | |
| 2014/0006644 A1* | 1/2014 | Pullagoundapatti | G06F 12/0284 710/4 |
| 2015/0113100 A1 | 4/2015 | Tweedale et al. | |
| 2015/0234734 A1* | 8/2015 | Agrawal | G06F 11/3692 714/38.1 |
| 2016/0019180 A1 | 1/2016 | Liu et al. | |
| 2016/0179646 A1* | 6/2016 | Neve De Mevergnies | G06F 11/27 714/30 |
| 2016/0350225 A1* | 12/2016 | Podaima | G06F 12/10 |
| 2017/0147807 A1* | 5/2017 | Rooyakkers | G05B 19/0425 |
| 2018/0013578 A1* | 1/2018 | Gozloo | G06F 3/0655 |
| 2019/0179645 A1 | 6/2019 | Prasad | |
| 2019/0303328 A1 | 10/2019 | Balski et al. | |
| 2020/0065280 A1 | 2/2020 | Huang et al. | |
| 2020/0092449 A1 | 3/2020 | Chang | |
| 2021/0160134 A1 | 5/2021 | Anquet et al. | |
| 2021/0160193 A1 | 5/2021 | Olson et al. | |

FOREIGN PATENT DOCUMENTS

| | | |
|---|---|---|
| EP | 2621136 A2 | 7/2013 |
| FR | 3003054 A1 | 9/2014 |
| WO | 2016099812 A1 | 6/2016 |

OTHER PUBLICATIONS

"Octo-SPI Interface on STM32 Microcontrollers," AN5050, Revision 7, Application Note, STMicroelectronics, Sep. 2021, 74 pages.
Venkateswara Rao, M., et al., "A Frame work on AMBA bus based Communication Architecture to improve the Real Time Computing Performance in MPSoC," International Journal of Computer Applications (0975-8887), Apr. 2014, 5 pages, vol. 91, No. 5.
"SPC58EHx/SPC58NHx N OctalSPI IO Manager," TN1365, Technical Note, STMicroelectronics, Jun. 22, 2021, 8 pages.

* cited by examiner

[Fig 1]
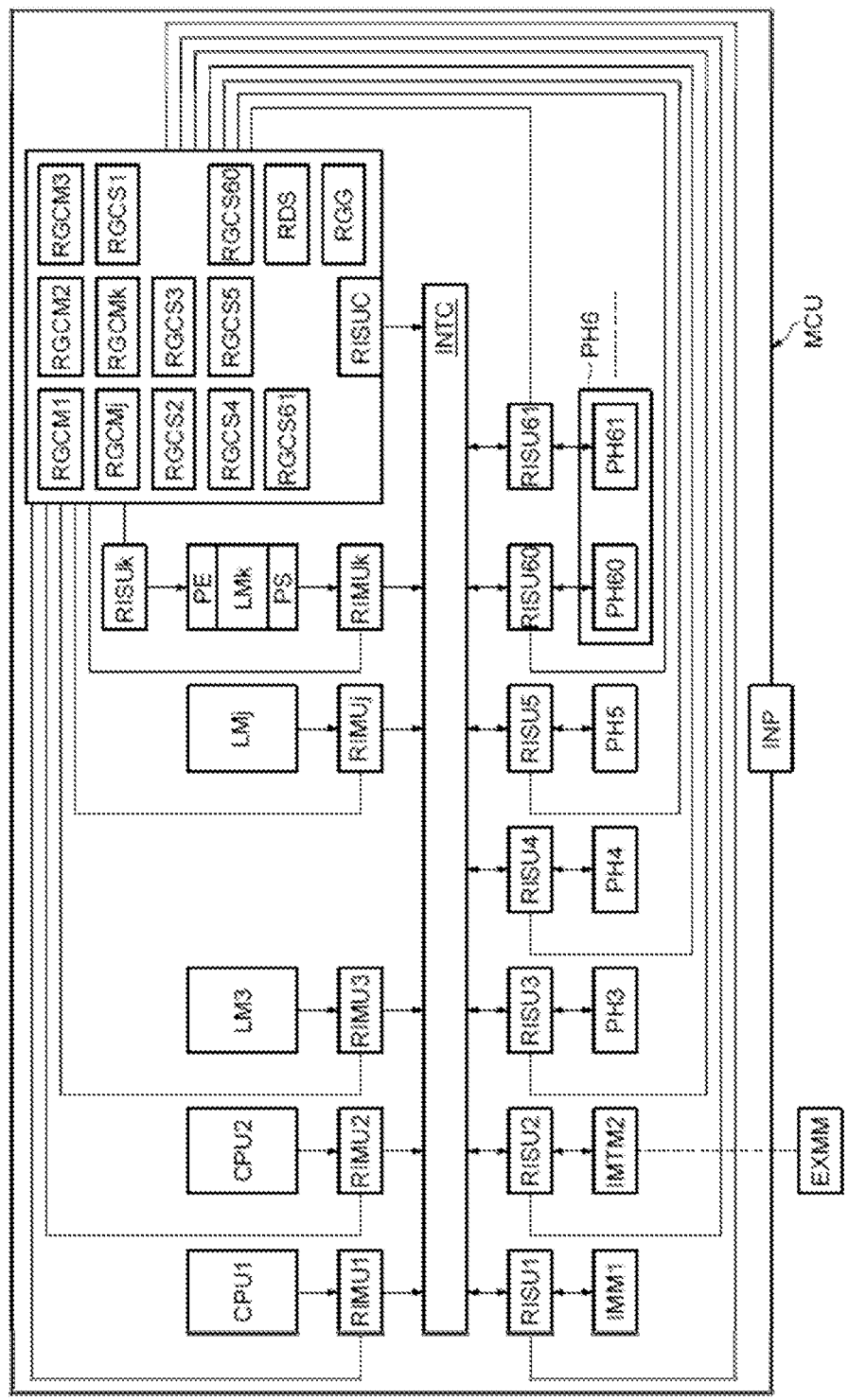

[Fig 2]
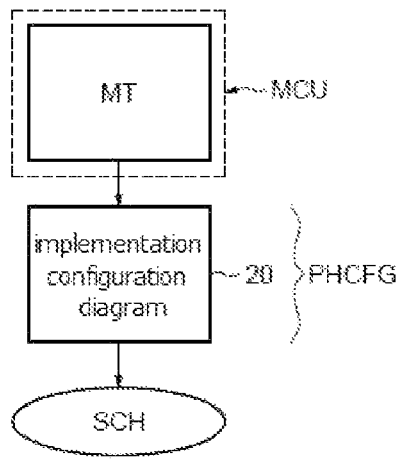
[Fig 3]
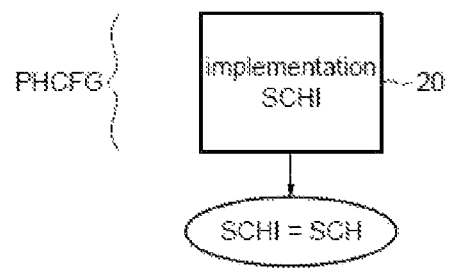
[Fig 4]
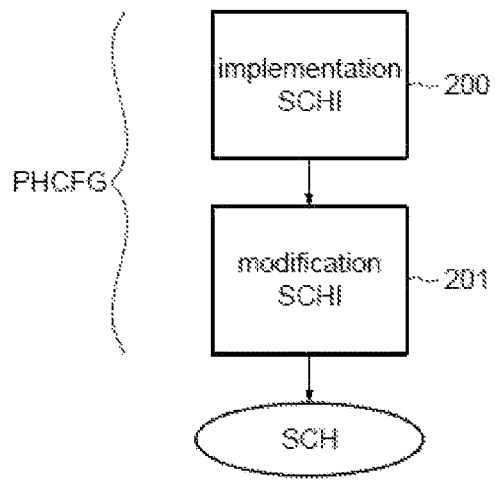

[Fig 5]
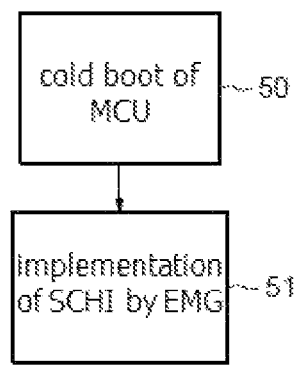
[Fig 6]
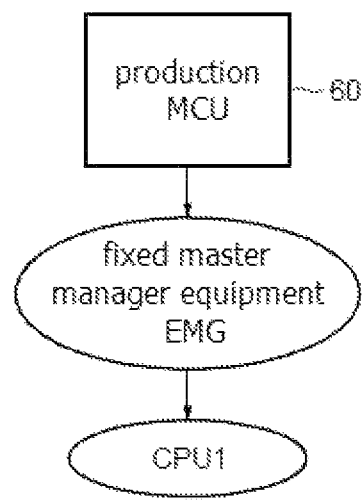

[Fig 7]
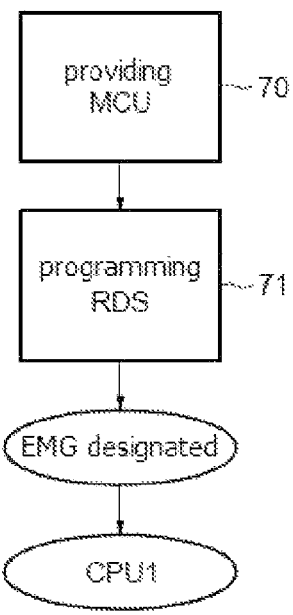
[Fig 8]
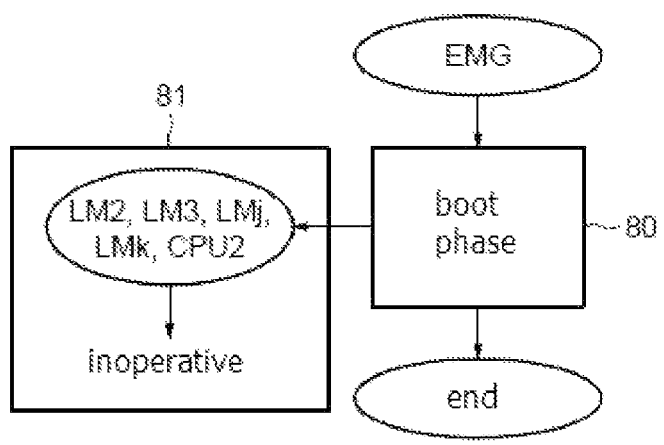

[Fig 9]
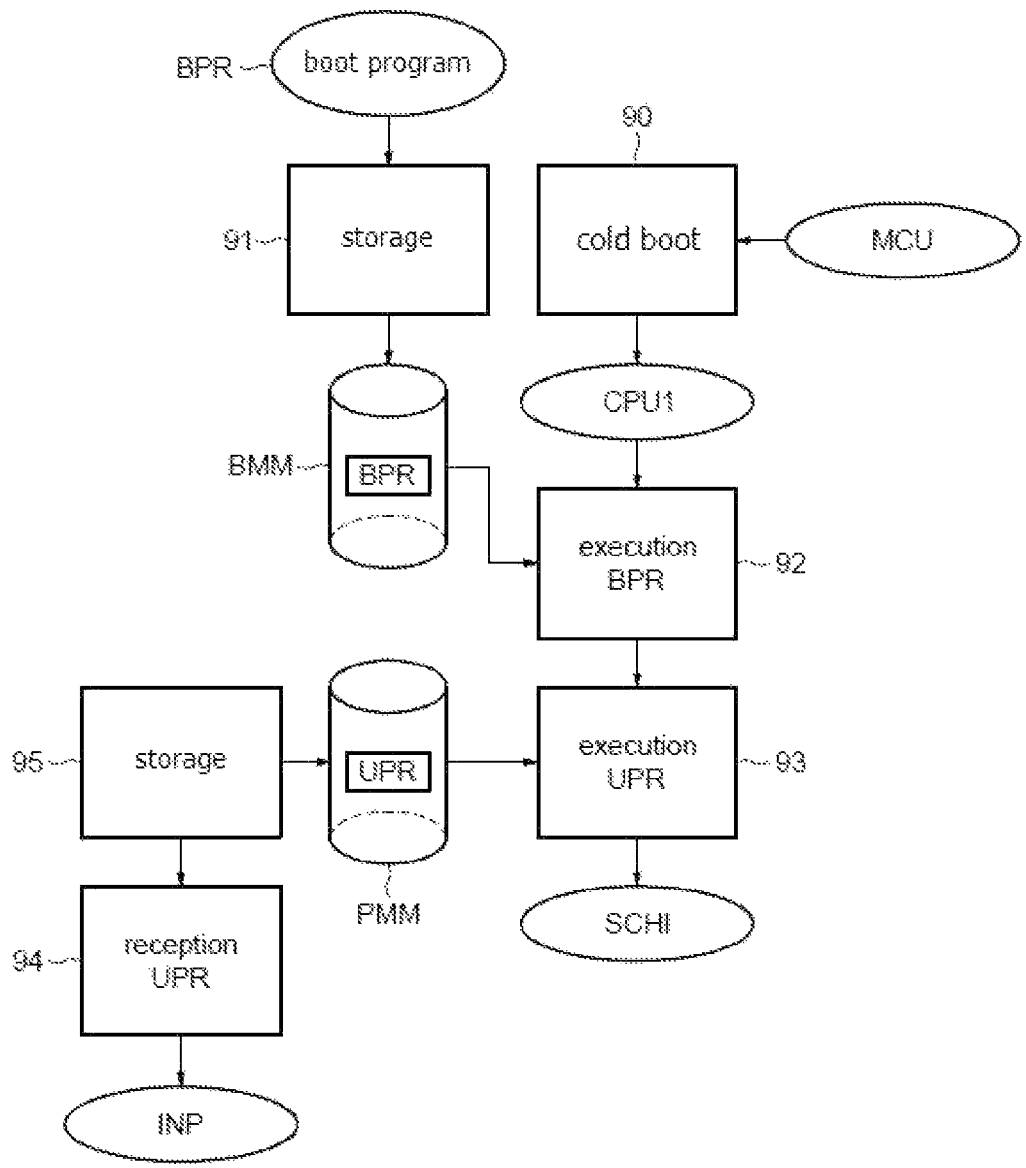

[Fig 10]
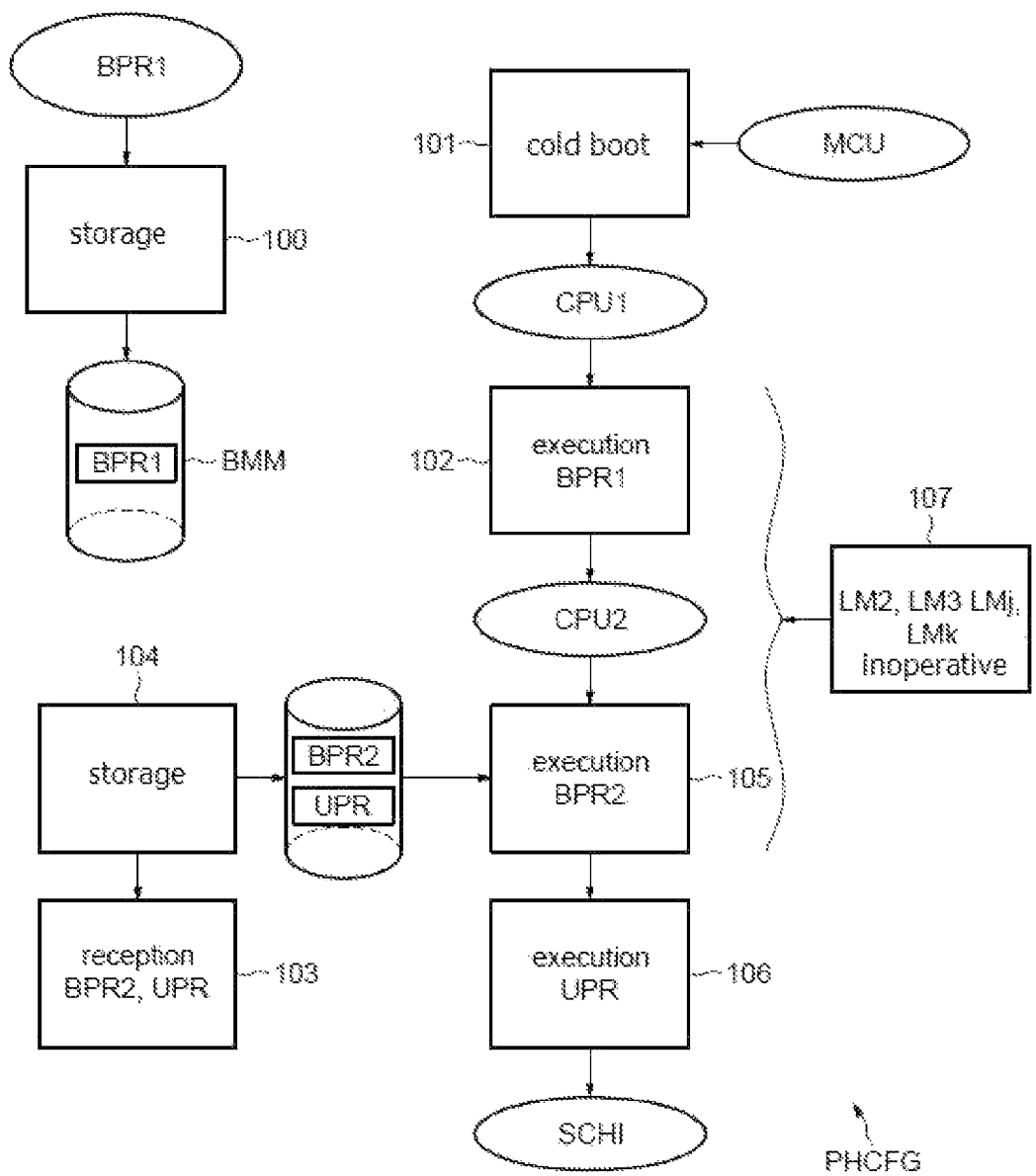

[Fig 11]
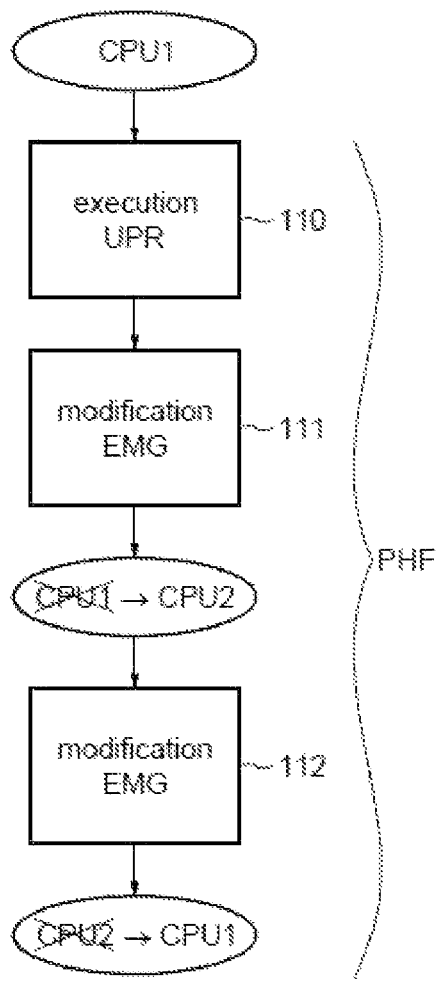

[Fig 12]
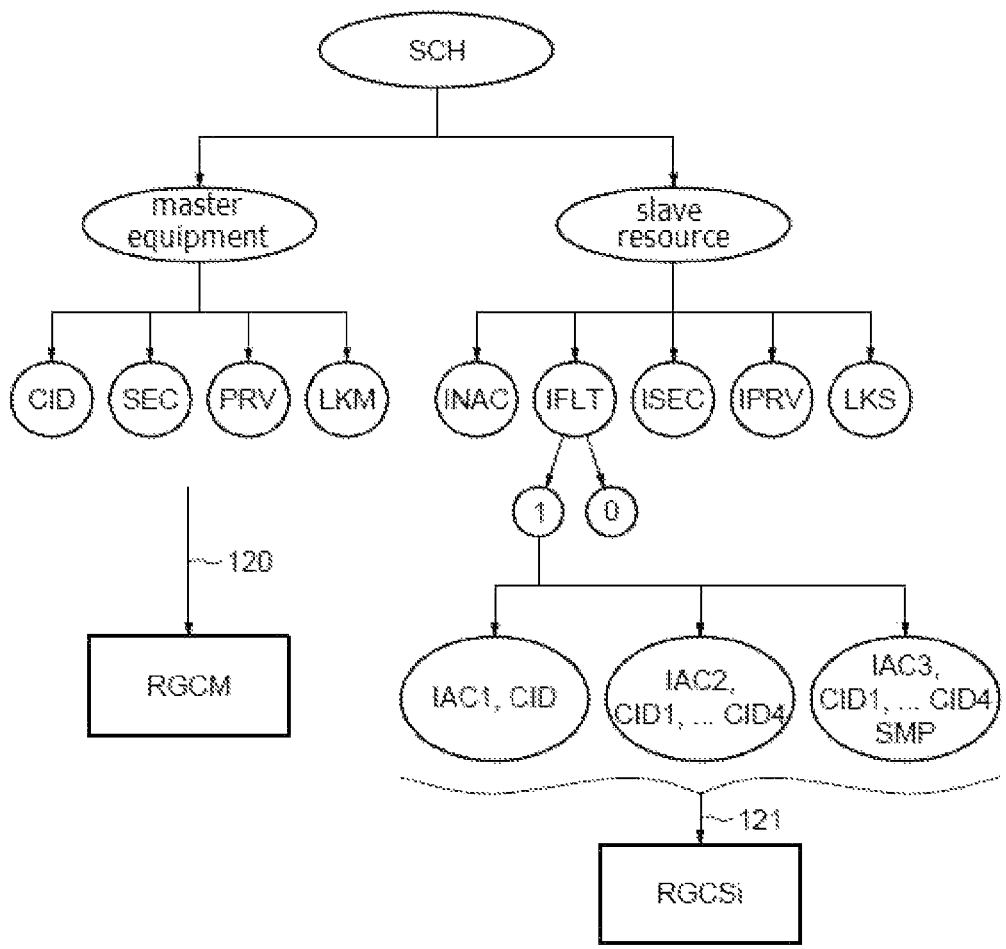
[Fig 13]
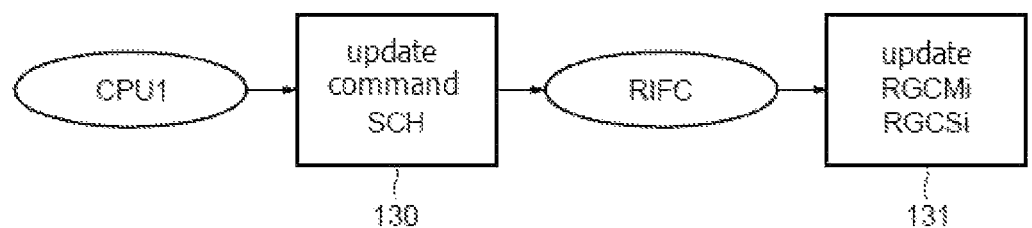

[Fig 14]
[Fig 15]
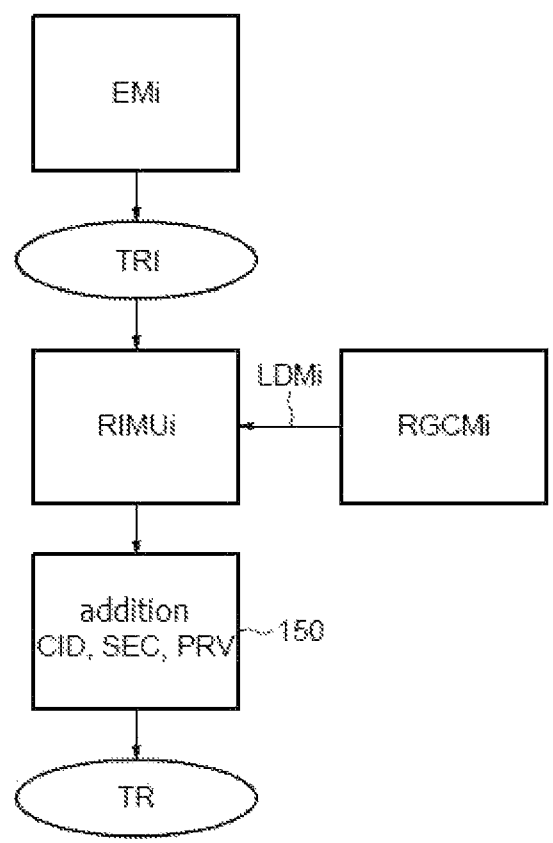

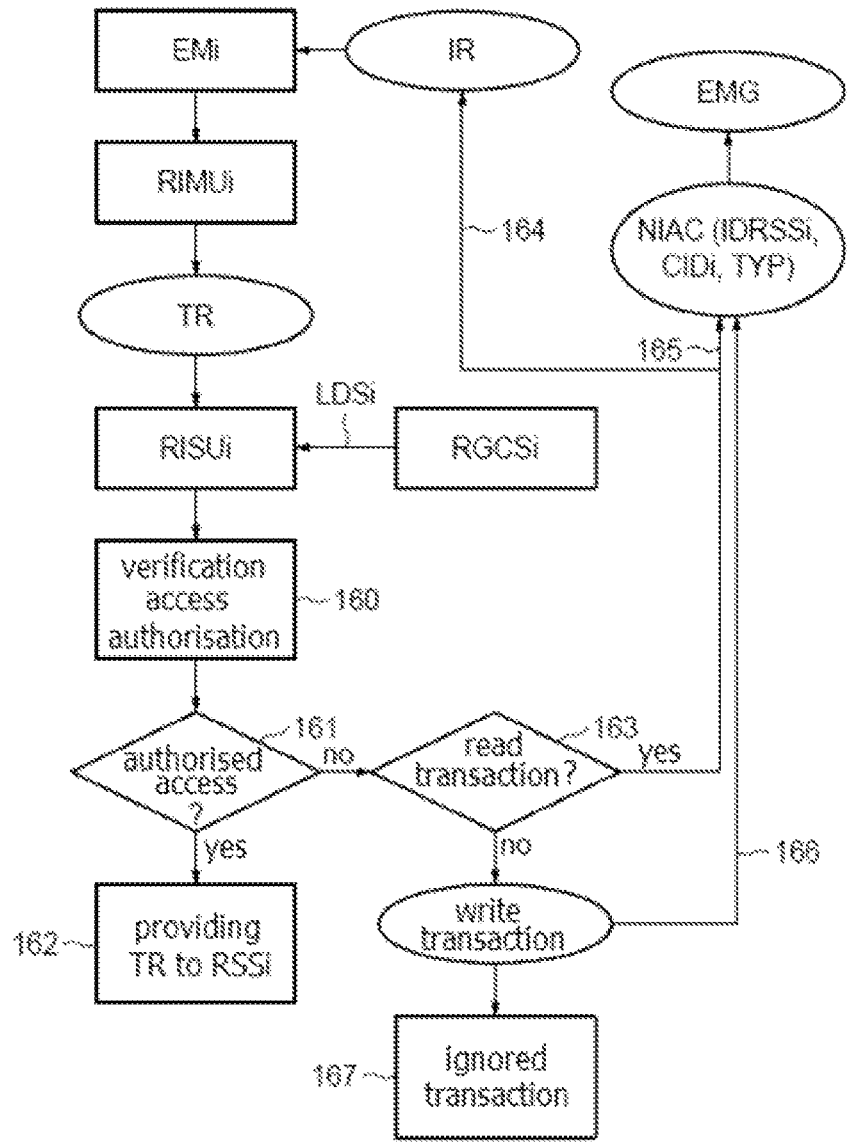
[Fig 16]

[Fig 17]
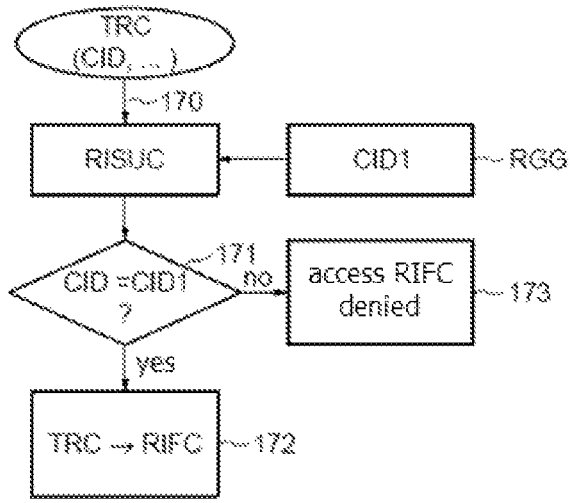
[Fig 18]
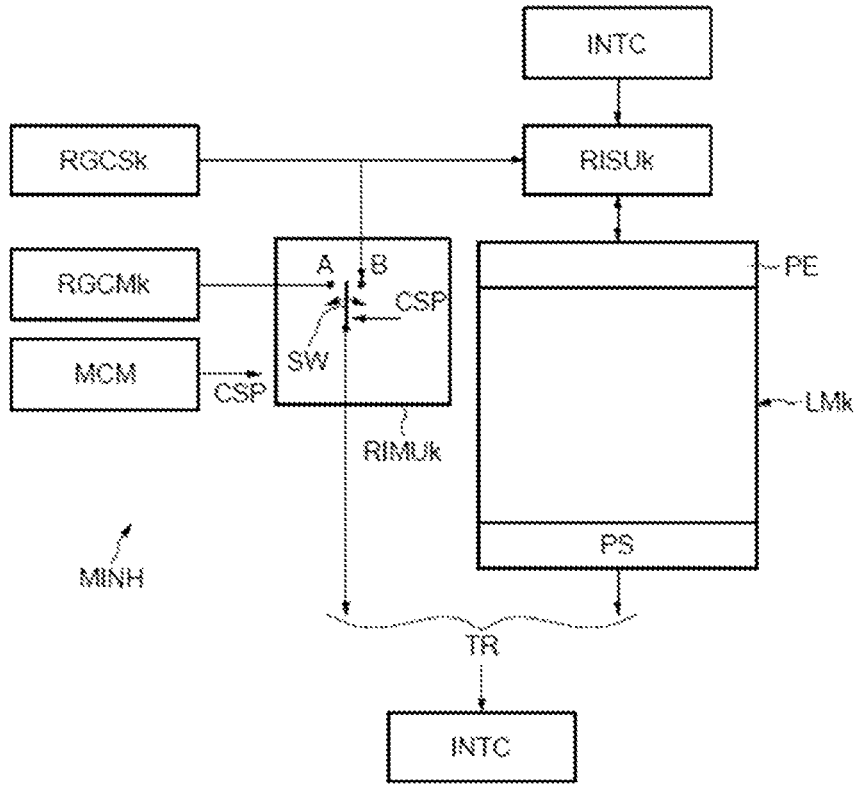

[Fig 19]
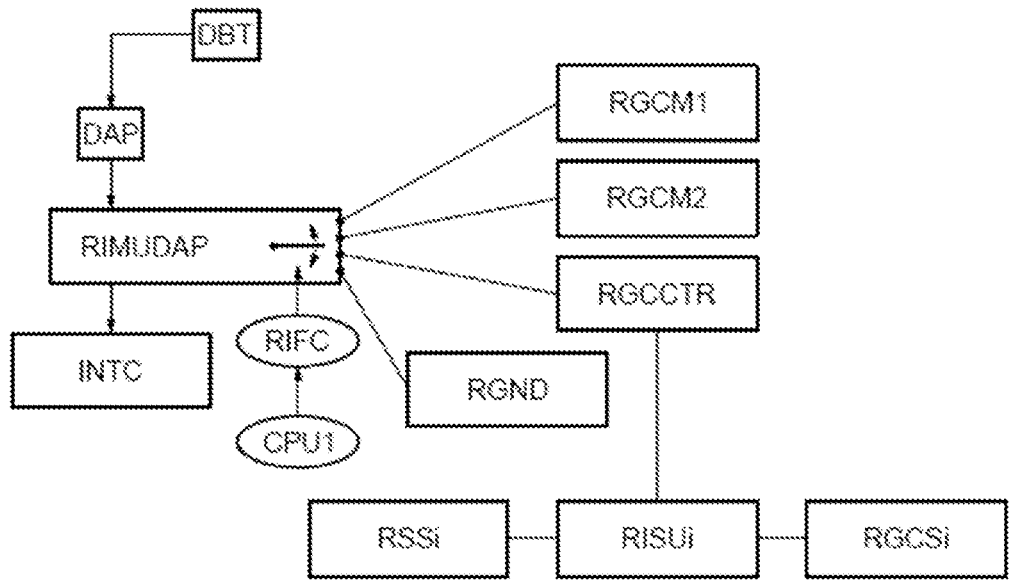
[Fig 20]
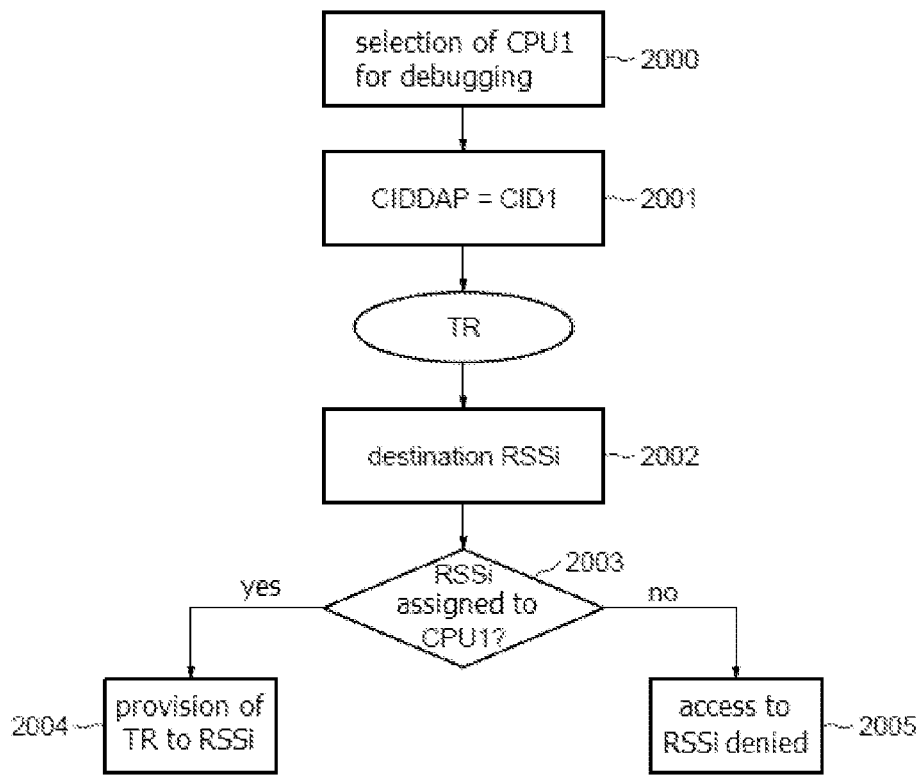

[Fig 21]
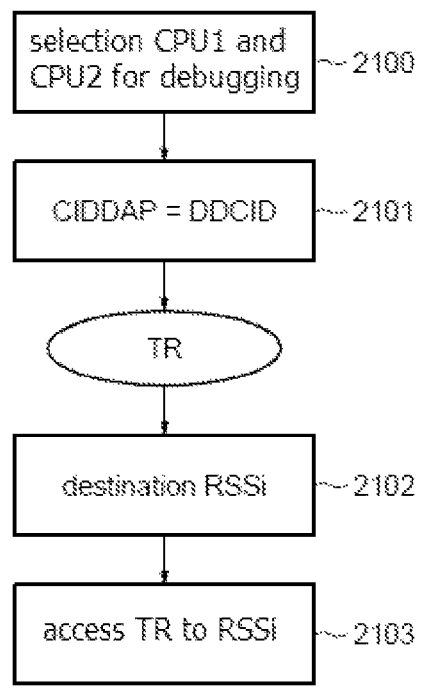
[Fig 22]
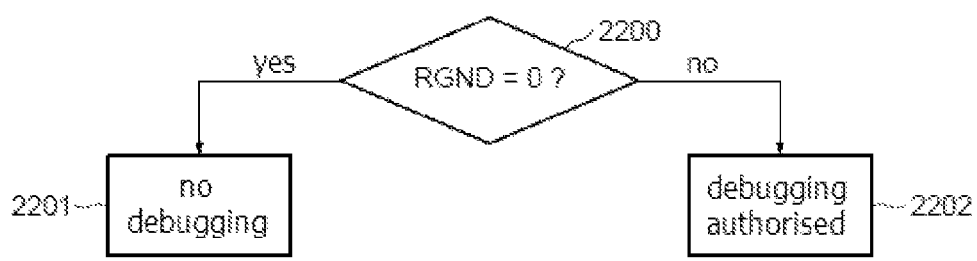

METHOD FOR MANAGING THE DEBUGGING OF A SYSTEM ON CHIP FORMING FOR EXAMPLE A MICROCONTROLLER, AND CORRESPONDING SYSTEM ON CHIP

CROSS-REFERENCE TO RELATED APPLICATIONS

This application claims the benefit of French Application No. 1913127, filed on Nov. 22, 2019, which application is hereby incorporated herein by reference.

TECHNICAL FIELD

Embodiments relate to integrated circuits, in particular systems on chip (SoC), for example, a microcontroller, and more particularly a system on chip including several microprocessors as well as the management of the debugging of such a system on chip.

SUMMARY

In order to help ensure the reliability of a system on chip, it may be necessary to restrict the access of one or more master pieces of equipment to specific slave resources. Such a feature is designated by the person skilled in the art under the term "isolation."

Embodiments provide management of these access restrictions simple to carry out and to implement, particularly in the case where this management is dynamic, for example when it depends on the applications considered for the system on chip, for example of the applications considered on the multiple cores of the chip.

Embodiments further provide a system on chip, for example, a microcontroller, allowing all the cases of use emanating from the various users of the system on chip as well as all the configurations in a flexible manner, and particularly including a low power mode.

Further embodiments provide a limited access to some parts of the system on chip to a debugging tool when debugging the system, in particular but not exclusively when different microprocessors have different degrees of security or have been subject to development by different companies.

According to one embodiment, a system on chip comprising several master pieces of equipment is proposed, including several microprocessors, and for example a direct memory access controller (DMA) without these examples being limiting.

The system on chip moreover includes several slave resources.

By way of non-limiting example, a slave resource can belong to the group formed by at least one peripheral, for example a peripheral of the I²C ("Inter Integrated Circuit") type, of the SPI ("Serial Peripheral Interface) type, of the UART ("Universal Asynchronous Receiver Transmitter) type, or else a Real Time Clock (RTC), a feature of a peripheral, for example an alarm line of the RTC peripheral, a memory means internal to the system on chip, a memory interface internal to the system on chip and intended to be coupled to a memory means external to the system on chip, for example a DDR ("Double Data Rate") type memory.

The system on chip moreover includes an interconnection system (known by the person skilled in the art under the name "interconnect") coupled between the master pieces of equipment and the slave resources and capable of routing transactions (for example write or read transactions) between the master pieces of equipment and the slave resources.

The system on chip moreover includes processing means at least configured to allow a user of the system on chip to implement within the system on chip at least one configuration diagram of this system on chip, this configuration diagram being defined by a set of configuration pieces of information.

The set of these configuration pieces of information, is not used for addressing the slave resources receiving the transactions but is used to define an assignment of at least one piece of master equipment to at least some of the slave resources, or else an assignment of at least some of the slave resources to at least one piece of master equipment.

Moreover, addressing the slave resources receiving the transactions is performed by means of an addressing field contained in the considered transaction. And not only the set of configuration pieces of information is not used for addressing the slave resources receiving the transactions, but also, the content of the addressing field of a transaction is not used to define the assignment of at least one piece of master equipment to at least some of the slave resources.

Thus, assigning one or more master pieces of equipment to one or more slave resources allows to manage the isolation architecture of the different slave resources and the different master pieces of equipment in a very simple and flexible manner by this set of configuration pieces of information.

Moreover, the processing means are further configured to select at least one of the microprocessors and authorize an external debugging tool to access, for debugging purposes, only to the slave resources assigned to the at least one selected microprocessor.

Thus this isolation architecture allows to simply implement such selective debugging.

The set of configuration pieces of information preferably includes at least one identification piece of information assigned to each master piece of equipment.

These identification pieces of information are advantageously intended to be attached to all the transactions emitted by the corresponding master pieces of equipment.

They are used particularly to designate the corresponding master piece of equipment.

It is quite possible, in a very simple case, that the set of configuration pieces of information includes only the identification pieces of information assigned to the master pieces of equipment. And then it can be seen that these identification pieces of information alone allow to easily manage and define the system on chip isolation architecture.

However, as will be seen in more detail below, the set of configuration pieces of information can generally include other configuration pieces of information than the identification piece of information, which will allow to refine the isolation architecture, with greater flexibility.

It is also possible that the processing means are further configured to prohibit the debugging tool from accessing the slave resources.

Thus it is possible to propose a selective debugging which provides the possibility of debugging a single microprocessor, a group of microprocessors (by authorizing the external debugging tool to access only the slave resources controlled by the selected microprocessor(s)), or all the microprocessors or else to prohibit any debugging.

This choice can preferably be implemented when booting the system on chip, as will be seen in more detail below, by a configuration controller under the control of a master piece of equipment, defined as master manager piece of equipment.

This choice can also be optionally modified later by the master manager piece of equipment.

According to one embodiment, the master pieces of equipment comprise a test access port intended to be coupled to the external debugging tool.

This test access port is assigned an identification piece of information, called test identification piece of information, which is modifiable, representative of the at least one selected microprocessor, and any slave resource assigned to the at least one selected microprocessor, is configured to accept receiving a transaction including this test identification piece of information.

More specifically, for example if a single microprocessor is selected, the test identification piece of information is the identification piece of information of the selected microprocessor.

If several microprocessors are selected, the test identification piece of information is for example a particular identification piece of information different from the identification pieces of information of the selected microprocessors and is configured to designate these selected microprocessors.

According to one embodiment, the system on chip comprises a set of configuration registers assigned to each slave resource and to each master piece of equipment, the set of configuration registers assigned to a slave resource being intended to store the various configuration pieces of information assigned to this slave resource, the set of configuration registers assigned to a master piece of equipment being intended to store the various configuration pieces of information assigned to this master piece of equipment and a configuration controller configured to update the contents of the sets of configuration registers with the set of configuration pieces of information under the control of a first master piece of equipment called master manager piece of equipment.

While it would be possible to also provide a set of configuration registers assigned to the test access port, it is advantageous when a single microprocessor is selected for debugging, that the set of configuration registers assigned to the test access port is that of the selected microprocessor.

Then, this allows the test access port to very easily inherit configuration pieces of information, and particularly identification piece of information, from the selected microprocessor.

The system on chip advantageously further comprises a centralized register intended to contain the particular identification piece of information.

This centralised register will easily allow, as will be seen in more detail below, the slave resources in particular to have access to this particular identification piece of information useful in the case of a global debugging.

The content of this centralized register can be hard-coded.

Alternatively, provision may be made for the configuration controller to also be configured to update the content of the centralized register under the control of the first master piece of equipment called master manager piece of equipment.

The set of configuration registers assigned to the test access port advantageously comprises the centralized register, which allows to easily add the particular identification piece of information to any transaction emitted by the test access port during a global debugging of the system on chip.

Moreover, the same identification pieces of information as the identification piece of information of the microprocessor can be assigned to at least some of the master pieces of equipment controllable by a microprocessor.

This allows to define a group or compartment of master pieces of equipment identified by the same identification piece of information. And, the master pieces of equipment of the same compartment can for example have access to identical memory resources.

However, it is also possible that a master piece of equipment controllable by a microprocessor is assigned an identification piece of information different from the identification piece of information of the microprocessor.

This can for example be the case of a master piece of equipment of the PCI express (PCI-E) type to which one does not wish to give access to some memory areas which can also be accessed by the microprocessor.

It is also possible that at least one piece of master equipment controllable by a microprocessor includes an output port capable of emitting transactions as well as an input port capable of receiving transactions. The input port is then considered as a slave resource and the output port as a master piece of equipment.

Such master piece of equipment having an input port and an output port can be for example a USB controller or else an SD card controller.

Now the set of configuration pieces of information defining the configuration diagram will be more detailed.

As previously seen, in a very simple case, it is possible that this set contains only the identification pieces of information of the master pieces of equipment.

However, other configuration pieces of information can complete this set.

Thus, according to one embodiment, the set of configuration pieces of information defining the configuration diagram may comprise for at least one slave resource, an inaccessibility piece of information intended to indicate that this slave resource is inaccessible by any master piece of equipment.

It is indeed quite possible that in some applications, the user decides that a slave resource should absolutely not be used by any master piece of equipment.

According to yet another embodiment, the set of configuration pieces of information defining the configuration diagram may comprise for each non-inaccessible slave resource, a filtering piece of information intended to indicate, based only on the identification pieces of information of the master pieces of equipment, whether this slave resource can be accessed by any master piece of equipment or by only one or more master pieces of equipment.

In other words, with this filtering piece of information, it is possible to enable or disable the filtering on the identification pieces of information of the master pieces of equipment. Thus, if filtering is enabled, then this means that the slave resource can be accessed by only one or more master pieces of equipment.

If filtering is disabled, this means that the slave resource can be accessed by any master piece of equipment, therefore, regardless of the identification piece of information attached to the transaction, but of course provided that other access restrictions will not be applied as will be seen in more detail below.

In other words, if no other access restriction is applied and filtering is disabled, then the slave resource can be accessed by any master piece of equipment.

In the event that this filtering is enabled, several other configuration pieces of information are then advantageously provided.

Thus, the set of configuration pieces of information defining a configuration diagram can thereby comprise, for each non-inaccessible slave resource, a first access piece of information, intended to indicate, in the case where the filtering piece of information indicates that the slave resource can be accessed by only one or more master pieces of equipment, that this slave resource can be accessed by one or more master pieces of equipment having the same identification piece of information.

In other words, in this case, the slave resource can only be accessed by a transaction including only this identification piece of information.

And of course, the set of configuration pieces of information includes these corresponding identification pieces of information.

Still in the case where the filtering piece of information indicates that the slave resource can be accessed by only one or more master pieces of equipment, the set of configuration pieces of information defining the configuration diagram can then further comprise, for each non-inaccessible slave resource, a second access piece of information intended to indicate that this slave resource can be accessed by master pieces of equipment having different identification pieces of information.

This can be the case for example for an internal memory means or for the memory interface intended to be coupled to an external memory means for example.

And, in this case, the set of configuration pieces of information comprises of course the list of identification pieces of information of the corresponding master pieces of equipment.

However, even if some slave resources can be accessed by master pieces of equipment having different identification pieces of information, it is also possible that, from these slave resources, at least one of them cannot be accessed simultaneously by several master pieces of equipment, particularly in order to avoid conflicts.

Therefore, it is advantageously provided that the set of configuration pieces of information defining the configuration diagram further comprises for at least one of the slave resources that can be accessed by the master pieces of equipment of the list, a third piece of information intended to indicate that the at least one of the slave resources can only be accessed by one master piece of equipment at a time, the master piece of equipment wishing to access this slave resource then being configured to use a semaphore.

In other words, the master piece of equipment of the list that wishes to access this slave resource must first "take" the semaphore before being able to access it. If the semaphore is not available, the master piece of equipment will not be able to access this slave resource and will have to wait for the semaphore to become available.

It is moreover particularly advantageous to define a secure mode and/or a privileged mode for the master pieces of equipment and the slave resources.

The concept of secure mode or privileged mode is well known to the person skilled in the art.

For example, for a processor in secure mode, dedicated Operating System (OS) can be used with resources that are not accessible in an unsecured mode.

In a privileged mode, the piece of equipment can benefit from privileged rights for access to resources that will not have other pieces of equipment which are not in privileged mode.

Thus, according to one embodiment, the set of configuration pieces of information defining the configuration diagram may comprise for each non-inaccessible slave resource, a security piece of information intended to indicate whether this slave resource is accessible by a master piece of equipment in secure mode or not.

The set of configuration pieces of information defining the configuration diagram may comprise for each non-inaccessible slave resource, a privileged piece of information intended to indicate whether this slave resource is accessible by a master piece of equipment in privileged mode or not.

In all of the above, the filtering concept and the set of configuration pieces of information apply to any slave resource, regardless of its nature.

Consequently, this applies particularly to peripherals.

It is therefore particularly possible to isolate a peripheral in a particular execution context for example for security and/or safety reasons.

But this also particularly applies to peripheral features.

As a result, it is therefore advantageously possible to particularly perform a filtering by peripheral feature.

And here again it is therefore particularly possible to isolate a feature within a peripheral in a particular execution context for example for security and/or safety reasons.

Moreover, the set of configuration pieces of information defining a configuration diagram may further comprise this time for each master piece of equipment, in addition to its identification piece of information, a security piece of information intended to indicate whether this master piece of equipment is configured in secure mode or not.

Likewise, the set of configuration pieces of information defining the configuration diagram may further comprise, for each master piece of equipment, in addition to its identification piece of information, a privileged piece of information intended to indicate whether this master piece of equipment is configured in privileged mode or not.

The first master manager piece of equipment is in turn preferably configured to be in secure mode and in privileged mode at the end of its boot phase.

As seen above, it is possible to modify a configuration diagram by modifying at least one configuration piece of information. However, it is also possible that the set of configuration pieces of information defining the configuration diagram further comprises, for at least some of the slave resources and at least some of the master pieces of equipment, a locking piece of information intended to indicate whether their configuration pieces of information can be modified or not.

As regards now the transactions conveyed between the master pieces of equipment and the slave resources, each transaction emitted by a master piece of equipment comprises, according to one embodiment, an addressing field whose content is intended to address the slave resource receiving this transaction and the content of the addressing field does not belong to the set of configuration pieces of information.

Indeed, as indicated above, the content of the addressing field does not intervene in the definition of the configuration diagram.

According to one embodiment, the processing means further include addition means configured to add to each transaction emitted by a master piece of equipment, at least the identification piece of information of this master piece of equipment, this identification piece of information not belonging to the addressing field of the transaction.

The addition means are further advantageously configured to add to each transaction emitted by a master piece of equipment, the security piece of information and/or the privileged piece of information if these two pieces of information or one of the two pieces of information do not already appear in the transaction emitted by the master piece of equipment.

Indeed, some master pieces of equipment can already emit a transaction containing bits representative of their secure and/or privileged mode. And in this case, it is obviously not necessary for the addition means to carry out such an addition.

According to one embodiment, the addition means include, for each master piece of equipment, an elementary management unit configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Such a "decentralization" of the addition means into local units assigned to each master piece of equipment, allows greater homogeneity of implementation of the system on chip and allows to easily add a master piece of equipment if necessary without having to modify the other elementary management units.

Each elementary management unit assigned to a master piece of equipment is preferably connected by a dedicated link at least to the set of configuration registers assigned to this master piece of equipment.

In other words, one does not use the communication buses of the interconnection circuit but uses a dedicated link, for example metal tracks of the integrated circuit.

This simplifies the production and programming of the system on chip.

According to one embodiment, at least one configuration piece of information is intended to be attached to each transaction and the processing means include verification means configured to verify whether a transaction emanating from a master piece of equipment and intended for a slave resource is authorised to access this slave resource using the at least one configuration piece of information attached to the transaction.

Particularly, the verification means are configured to verify whether a transaction emanating from the test access port and intended for a slave resource is authorized to access this slave resource, using the at least one test identification piece of information attached to the transaction.

According to another embodiment, it is possible that the verification means are configured to verify whether a transaction emanating from the test access port and intended for a slave resource is authorized to access this slave resource also using at least the security piece of information and the privileged piece of information attached to the transaction.

The verification means are advantageously configured to perform the verification downstream of the interconnection circuit.

Indeed, performing a verification downstream of the interconnection circuit and not upstream again allows homogeneity of implementation and easily allows to add a slave resource in an easier manner or even to have a register or bit-exact granularity.

To complete this homogeneity of implementation and this ease of adding a slave resource if necessary, the verification means advantageously include, for each slave resource, an elementary verification module configured to access the set of configuration pieces of information assigned to this slave resource as well as the particular identification piece of information.

Here again, therefore, there is a decentralization of the verification means into localised modules.

Each elementary verification module assigned to a slave resource is again advantageously connected by a dedicated link to the set of configuration registers assigned to this other slave resource as well as to the centralized register, for example by metal tracks.

As seen above, it is possible that from the master pieces of equipment, there is at least one piece of master equipment having a slave port and a master port, for example a USB controller, with configuration pieces of information assigned to the slave port and configuration pieces of information assigned to the master port.

It is also possible that this master piece of equipment having a slave port and a master port is firstly controlled by a first microprocessor then secondly by a second microprocessor, the two microprocessors having different configuration pieces of information. And, it is advantageous that when a processor controls such a master piece of equipment, the configuration pieces of information of the input port are duplicated at the output port.

Thus, according to an advantageous embodiment, the processing means include inheritance means configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, when another microprocessor takes control of such a master piece of equipment, the inheritance means can allow by a simple switching, and if the inheritance rules allow it, to confer to the master port the configuration pieces of information of the slave port which correspond to those of the other microprocessor.

However, the inheritance rules prohibit, for example, defining a port for a peripheral in secure mode if the master piece of equipment which controls it is not itself in secure mode.

Thus, in more detail and according to a possible embodiment, the inheritance means include, within the elementary management unit assigned to the master port, a set of controllable switches connected to at least some of the configuration registers assigned to the slave port and to the homologous configuration registers assigned to the master port, and control means configured to control the set of switches so as to select either the corresponding configuration registers assigned to the master port or the corresponding configuration registers assigned to the slave port.

Similar inheritance means can for example be implemented within the elementary management unit assigned to the test access port, so as to select for example either the set of configuration registers assigned to the microprocessor selected for debugging or the centralized register in the event of a global debugging of the system on chip.

According to another embodiment, a method for managing the operation of a system on chip is proposed, the system on chip comprising several master pieces of equipment including several microprocessors, several slave resources, an interconnection circuit coupled between the master pieces of equipment and the slave resources and capable of routing transactions between master pieces of equipment and slave resources, the method comprising a configuration phase including defining at least one configuration diagram by a set of configuration pieces of information allowing to define an assignment of at least one piece of master equipment to at least some of the slave resources, and implementing within the system on chip the at least one configuration diagram, a selection of at least one microprocessor and authorization, for an external debugging tool, to access, for debugging purposes, only to the slave resources assigned to the at least one selected microprocessor, or else a prohibition for the debugging tool, from accessing any slave resource.

According to one embodiment, the master pieces of equipment include a test access port coupled to the external debugging tool, the set of configuration pieces of information includes at least one identification piece of information assigned to each master piece of equipment, the method also including assigning to the test access port an identification piece of information, called test identification piece of information, which is modifiable, and which is representative of the at least one selected microprocessor, and the method further comprising adding at least these identification pieces of information to all the transactions emitted by the corresponding master pieces of equipment, and any slave resource assigned to the at least one selected microprocessor accepts receiving any transaction including this test identification piece of information.

According to one embodiment, if only one microprocessor is selected, the test identification piece of information is the identification piece of information of the microprocessor.

According to one embodiment, if several microprocessors are selected, the test identification piece of information is a particular identification piece of information different from the identification pieces of information of the selected microprocessors and configured to designate these selected microprocessors.

According to one embodiment, a slave resource belongs to the group formed at least of a peripheral, a feature of a peripheral, a memory means internal to the system on chip, a memory interface internal to the system on chip and intended to be coupled to a memory means external to the system on chip.

According to one embodiment, the method comprises updating the configuration pieces of information assigned to each slave resource and to each master piece of equipment, under the control of a first master piece of equipment called master manager piece of equipment.

According to one embodiment, the set of configuration pieces of information defining the configuration diagram comprises for each non-inaccessible slave resource, a security piece of information indicating whether this slave resource is accessible by a master piece of equipment in secure mode or not.

According to one embodiment, the set of configuration pieces of information defining the configuration diagram comprises for each non-inaccessible slave resource, a privileged piece of information indicating whether this slave resource is accessible by a master piece of equipment in privileged mode or not.

According to one embodiment, the set of configuration pieces of information defining the configuration diagram comprises for each master piece of equipment, in addition to its identification piece of information, a security piece of information indicating whether this master piece of equipment is configured in secure mode or not.

According to one embodiment, the set of configuration pieces of information defining the configuration diagram further comprises for each master piece of equipment, in addition to its identification piece of information, a privileged piece of information indicating whether this master piece of equipment is configured in privileged mode or not.

According to one embodiment, the method comprises a configuration of the first master manager piece of equipment in secure mode and in privileged mode at the end of its boot phase.

According to one embodiment, each transaction emitted by a master piece of equipment comprises an addressing field whose content addresses the slave resource receiving this transaction, and the content of the addressing field does not belong to the set of configuration pieces of information.

According to one embodiment, each transaction emitted by a master piece of equipment comprises an addressing field whose content addresses the slave resource receiving this transaction, and the method comprises adding to each transaction emitted by a master piece of equipment, at least the identification piece of information of this master piece of equipment, the identification piece of information not belonging to the addressing field of the transaction.

According to one embodiment, the method comprises adding to each transaction emitted by a master piece of equipment, the security piece of information and/or the privileged piece of information if these two pieces of information or one of these two pieces of information do not already appear in the transaction emitted by the master piece of equipment.

According to one embodiment, at least one configuration piece of information is attached to each transaction, and the method comprises verifying whether a transaction emanating from the test access port and intended for a slave resource is authorized to access this slave resource, the verification including using the at least one test identification piece of information attached to the transaction.

According to one embodiment, the verification comprises using at least the security piece of information and the privileged piece of information attached to the transaction.

According to one embodiment, the verification is performed downstream of the interconnection circuit.

According to one embodiment, the verification comprises local verifications performed at the slave resources from the configuration pieces of information respectively assigned to these slave resources and from the particular identification piece of information.

BRIEF DESCRIPTION OF THE DRAWINGS

Other advantages and features of the description will appear upon examining the detailed description of non-limiting embodiments and appended drawings:

FIG. 1 shows a system on chip;

FIG. 2 shows a method for implementing a configuration program during a configuration phase within the system on chip;

FIG. 3 shows processing means configured to allow a user to implement a configuration program during configuration phase;

FIG. 4 shows processing means configured to allow a user to alternatively implement an configuration program during configuration phase;

FIG. 5 shows a configured first master manager piece of equipment in response to a first boot or a cold boot;

FIG. 6 shows a first master manager piece of equipment selected during production, e.g., by hard-coding;

FIG. 7 shows a first master manager piece of equipment selected by using a programmable designation register;

FIG. 8 shows a method for booting a selected master piece of equipment while all other master pieces of equipment are inoperative until the boot phase is completed;

FIG. 9 shows an installation means;

FIG. 10 shows a method for modifying a master manager piece of equipment during the configuration phase;

FIG. 11 shows a method for changing a master manager piece of equipment during the operation phase;

FIG. 12 shows an example of a set of configuration pieces of information defining a configuration diagram;

FIG. 13 shows a master manager piece of equipment configured to control an update of the configuration diagram;

FIG. 14 describes an example of a content of a transaction;

FIG. 15 shows the interchange of a master piece of equipment and its associated elementary management unit;

FIG. 16 shows a verification means;

FIG. 17 shows an auxiliary verification module assigned to an configuration controller;

FIG. 18 shows a master piece of equipment having an input port and an output port;

FIG. 19 shows a system on chip with a test access port;

FIG. 20 shows a method for debugging a microprocessor;

FIG. 21 shows a method for selecting two microprocessors for global debugging; and FIG. 22 shows a method for prohibiting any debugging.

DETAILED DESCRIPTION OF ILLUSTRATIVE EMBODIMENTS

In FIG. 1, the reference MCU designates a system on chip here forming a microcontroller, although this example is not limiting.

The system on chip MCU here comprises several master pieces of equipment CPU1, CPU2, LM3 . . . LMj . . . LMk.

In this example, the master pieces of equipment CPU1 and CPU2 are microprocessors and the other master pieces of equipment can be for example master pieces of equipment of Direct Memory Access type (DMA) or else for example USB controllers or even PCI express type master piece of equipment, without this list of examples being exhaustive.

The system on chip also comprises from the master pieces of equipment, a test access port DAP, conforming for example to the standard JTAG, intended to be coupled to an external debugging tool DBT.

The system on chip MCU also includes several slave resources IMM1, IMTM2, PH3, PH4, PH5, PH60 and PH61.

Generally, a slave resource belongs to the group formed at least by a peripheral, a feature of a peripheral, a memory means internal to the system on chip MCU, a memory interface internal to the system on chip and intended to be coupled to a memory means external to the system on chip.

Thus, in the example illustrated, the slave resource IMM1 is a memory means for the system on chip.

The term "memory means" is understood here in a general manner and incorporates for example a complete memory or then one or more memory areas for example.

The slave resource IMTM2 is here an internal memory interface intended to be coupled to an external memory means EXMM, for example a DRAM memory.

The slave resources PH3, PH4 and PH5 are peripherals, for example a UART type peripheral, an PC controller, an SPI controller.

The reference PH6 here designates a Real Time Clock (RTC) device including for example the module PH60 intended to provide the clock signal and the module PH61 intended for example to provide an alarm.

In this case, the modules PH60 and PH61 which are features of the real time clock device PH6 are considered as slave resources.

The structure of the master pieces of equipment and of the slave resources is conventional and known per se.

The system on chip MCU moreover includes an interconnection circuit INTC capable of routing transactions between master pieces of equipment and slave resources.

The structure of such an interconnection circuit, which is generally a multilayer interconnection circuit, as well as the protocol allowing the exchange and the routing of the transactions inside the interconnection circuit are well known to the person skilled in the art.

This can for example refer in particular: to the article by Venkateswara Rao and others entitled "A Frame work on AMBA bus based Communication Architecture to improve the Real Time Computing Performance in MPSoC," International Journal of Computer Applications (0975-8887), Volume 91-No. 5, April 2014, or a general presentation of these interconnection circuits made in 2015 by A. Gerstlauer and available at the internet address http://users.ece.utexas.edu/~gerstl/ee382v_fl4/lectures/lecture_12.pdf.

Moreover, in an indicative but non-limiting manner, for example the interconnection circuit marketed by the company ARM under the reference NIC-400 (version Rop3) can be used.

The system on chip also includes, associated with each master piece of equipment and with each slave resource, a set of configuration registers including several configuration registers intended for storing configuration pieces of information respectively, the meaning of which will be explained in more detail below.

The reference RGCM1 designates the set of configuration registers associated with the master piece of equipment CPU1.

The reference RGCM2 designates the set of configuration registers associated with the master piece of equipment CPU2.

The reference RGCM3 designates the set of configuration registers assigned to the master piece of equipment LM3.

The reference RGCMJ designates the set of configuration registers assigned to the master piece of equipment LMj.

Moreover, the system on chip here includes the master piece of equipment LMk, for example a USB controller controllable by a microprocessor, for example the microprocessor CPU1, and this master piece of equipment LMk includes an output port PS capable of emitting transactions as well as an input port PE capable of receiving transactions.

The input port PE is then considered as a slave resource and the output port PS is then considered as a master piece of equipment.

Therefore, the reference RGCMk designates the set of configuration registers assigned to the master piece of equipment PS.

The reference RGCS1 designates the set of configuration registers assigned to the slave resource IMM1.

The reference RGCS2 designates the set of configuration registers associated with the slave resource IMTM2.

The reference RGSC3 designates the set of configuration registers associated with the peripheral PH3.

The reference RGCS4 designates the set of configuration registers assigned to the peripheral PH4.

The reference RGCS5 designates the set of configuration registers assigned to the peripheral PH5.

The reference RGCS60 designates the set of configuration registers assigned to the feature PH60.

And, the reference RGCS61 designates the set of configuration registers assigned to the feature PH61.

Moreover, in this example, a register RDS, called designation register, is provided, the feature of which will be discussed in more detail but, which, can already be indicated that it is used to designate a master piece of equipment having the quality of a master manager piece of equipment.

Moreover, the register RGG, called manager register, the feature of which will also be discussed below in more detail, is used to designate the current master manager piece of equipment, which, as will be seen in more detail below, may possibly be modified during the operation of the system on chip MCU, that is to say here during the execution of a user program.

There is also provided here a register called centralised register, RGCCTR, the feature of which will also be discussed in more detail, and which is used in the case of a global debugging of the system on chip, that is to say a debugging of all the microprocessors.

As will be seen in more detail below in the context of a particularly advantageous embodiment, involving a concept of "inheritance", the set of registers assigned to the test access port DAP can be either the set of registers RGCM1 associated with the master piece of equipment CPU1 or the set of configuration registers RGCM2 associated with the master piece of equipment CPU2, or the centralized register RGCTR.

The various sets of configuration registers are shown here within a controller RIFC.

However, they could be located outside the controller.

The system on chip MCU also includes an elementary management unit RIMU1, RIMU2, RIMU3, RIMUj, RIMUk associated with each master piece of equipment.

The structure and feature of these elementary management units can be discussed in more detail, but it can be the that they are part of addition means intended to add to any transaction emitted by a master piece of equipment, an identification piece of information CID and optionally a security piece of information and/or a privileged piece of information.

An elementary management unit RIMUDAP is also associated with the test access port and intended to add to any transaction emitted by the test access port, an identification piece of information called test identification piece of information and optionally security piece of information and/or privileged piece of information.

As will be seen below, this test identification piece of information can be the identification piece of information of one of the microprocessors or else a particular identification piece of information, different from the identification pieces of information of the microprocessors, contained in the centralized register RGCCTR.

The system on chip also includes, associated with each slave resource, an elementary verification module RISU1, RISU2, RISU3, RISU4, RISU5, RISU60 and RISU61 the structure and feature of which will also be discussed in more detail below.

It can already be the that these elementary verification modules are part of the verification means intended to verify whether a transaction intended for a slave resource is authorized to access this slave resource.

The various elementary management units RIMU and the various elementary verification modules RISU are respectively connected to the sets of corresponding configuration registers by specific links, for example metal tracks.

While the elementary verification modules RISUi have been shown in FIG. 1 outside the corresponding peripherals, it is quite possible to provide one or more peripherals having their corresponding elementary verification module, integrated into the peripheral itself.

Now, if reference is made more particularly to FIG. 2, the system on chip MCU includes processing means MT, distributed in particular within the various elements which have been described with reference to FIG. 1, and configured to allow a user of the system on chip to implement within the system on chip, during a configuration phase PHCFG (step 20), a configuration diagram SCH which is defined by the set of configuration pieces of information which will be stored in the various sets of configuration registers.

Before discussing in more detail the constitution of these configuration pieces of information, it can already be noted that the user has the possibility of implementing a static or dynamic configuration.

More specifically, as illustrated in FIG. 3, the processing means are configured to allow a user of the system on chip to implement (step 20) an initial configuration diagram SCHI which will form the configuration diagram SCH.

In other words, according to this variant, once the initial configuration diagram has been implemented, it remains valid during the use or operating phase of the system on chip.

Alternatively, as illustrated in FIG. 4, it is possible for a user, during the configuration phase PHCFG, to have implemented by the processing means MT (step 200) an initial configuration diagram having an initial set of configuration pieces of information then having the initial configuration diagram modified (step 201) by the processing means by modifying the value of at least one configuration piece of information, for example, of this initial set so as to obtain the set of configuration pieces of information defining a new configuration diagram SCH.

The processing means comprise installation means which include, from the master pieces of equipment, a first master piece of equipment called first master manager piece of equipment.

As illustrated in FIG. 5, this first master manager piece of equipment EMG is configured, in response to a first boot 50, or cold boot of the system on chip, to perform a boot phase at the end of which this first master manager piece of equipment EMG is configured to at least allow the implementation 51 of the initial configuration diagram SCHI.

As schematically illustrated in FIG. 6, the designation of the first master manager piece of equipment EMG can be fixed during the production 60 of the system on chip MCU, for example by hard-coding.

Alternatively, it is possible for the user to use the programmable designation register RDS allowing to designate the first master manager piece of equipment EMG.

More specifically, as illustrated in FIG. 7, during the provision 70 of the system on chip MCU, the user can proceed with a programming 71 of the designation register RDS, for example by programming or not series of memories of the OTP type forming the designation register RDS so as to designate the master manager piece of equipment EMG, which is for example in this example the microprocessor CPU1.

In particular, in order to avoid conflicts, the installation means are further configured, as illustrated in FIG. 8, to temporarily make inoperative (step 81) all the other master pieces of equipment LM2, LM3, LMj, LMk, CPU2 as long as the first master manager piece of equipment EMG, here the microprocessor CPU1, has not completed its boot phase 80.

When a master piece of equipment is a microprocessor, it can be made inoperative by for example forcing the reset signal to 0 which keeps it in standby state.

When the other master pieces of equipment are pieces of equipment controlled by a microprocessor, they are of course inoperative as long as the processor itself is inoperative.

By way of example, as illustrated in FIG. 9, the installation means include, in addition to the master manager piece of equipment EMG, a boot memory (boot ROM) BMM configured to store, in a storage step 91, a boot program BPR executable only by the first master manager piece of equipment CPU1 during the first boot or cold boot of the system on chip (steps 90 and 92).

The installation means moreover include an input INP (FIG. 1) configured to receive a user program. This user program can for example be stored on an SD card cooperating with the input INP.

This user program UPR (FIG. 9) is received from the input INP in step 94 and stored (step 95) in a program memory PMM.

This user program UPR contains at least instructions representative of the initial configuration diagram SCHI.

The processing means then include allocation means allowing to implement the initial configuration diagram.

In this example, the allocation means include the first master manager piece of equipment (for example the microprocessor CPU1) configured, at the end of its boot phase, to execute (step 93) the user program UPR in order to implement the initial configuration diagram.

While a microprocessor, for example the microprocessor CPU1, has been described here as the first master manager piece of equipment EMG, it is quite possible, alternatively, that the first master manager piece of equipment comprises a hardware logic circuit.

While a single master manager piece of equipment has just been described during the configuration phase PHCFG, it is possible, as schematically illustrated in FIG. 10, to modify the master manager piece of equipment during this configuration phase.

More specifically, the installation means then include, from the master pieces of equipment, a master piece of equipment called the initial master manager piece of equipment, for example the microprocessor CPU1, configured, during the first boot of the system on chip, to perform a boot phase at the end of which it is configured to authorize a boot of another master piece of equipment designated as being a new master manager piece of equipment, for example the microprocessor CPU2.

This new master manager piece of equipment then forms the first master manager piece of equipment which is configured, at the end of its boot phase, to at least allow the implementation of the initial configuration diagram.

The initial master manager piece of equipment may comprise a microprocessor and the new master manager piece of equipment may comprise another microprocessor.

Alternatively, the initial master manager piece of equipment may comprise a hardware logic circuit and the new master manager piece of equipment may comprise a microprocessor.

And, here again, the installation means are configured to temporarily make all the other master pieces of equipment inoperative as long as the boot phase of the initial master manager piece of equipment and that of the new master manager piece of equipment are not completed.

As an example illustrated in FIG. 10, the installation means include in this regard a boot memory BMM configured to store (step 100) a boot program BPR1 executable only by the initial master manager piece of equipment CPU1 during the first boot or cold boot 101 of the system on chip MCU.

The installation means also include a program memory PMM configured to store the boot program BPR2 of the new master manager piece of equipment CPU2.

A reception is then provided, for example via the input INP, of the boot program BPR2 and the user program UPR, these two programs being stored (step 104) in the program memory PMM.

During cold boot 101, the initial master manager piece of equipment CPU1 executes its boot program BPR1 (step 102) and then authorizes the boot of the microprocessor CPU2 which is the new master manager piece of equipment.

The latter executes in step 105 its boot program PBR2 then the user program UPR (step 106) in order to implement the initial configuration diagram SCHI.

Of course, as indicated above, in step 107, the other master pieces of equipment LM2, LM3, IMj and IMk are inoperative.

While it has been seen previously that it was possible to change master manager piece of equipment during the configuration phase, it is also possible, as illustrated in FIG. 11, to change master manager piece of equipment during the operating phase PHF of the system on chip, that is to say during the execution of the user program after implementing the configuration diagram.

More specifically, in FIG. 11, the microprocessor CPU1 is a first master manager piece of equipment. And, during the execution 110 of the user program UPR, the processing means MT modify (step 111) the master manager piece of equipment EMG which, in this case, becomes a new master manager piece of equipment CPU2.

It is of course possible that this new master manager piece of equipment CPU2 can in turn designate (step 112) a new master manager piece of equipment and then lose its quality as master manager piece of equipment. As an example, this new master manager piece of equipment may again be the microprocessor CPU1.

In this regard, only the master manager piece of equipment can designate a new master manager piece of equipment. And for example this is done by writing in the manager register RGG by the current master manager piece of equipment, the identification piece of information of the new master manager piece of equipment.

From that moment, the old master manager piece of equipment then has lost its quality as master manager piece of equipment.

Reference is now made more particularly to FIG. 12 to illustrate an example of a set of configuration pieces of information defining a configuration diagram SCH.

The set of configuration pieces of information includes, for each piece of equipment, an identification piece of information CID. This identification piece of information allows to identify the master piece of equipment from the list of master pieces of equipment.

This identification piece of information CID can for example be a digital word.

The set of configuration pieces of information of a master piece of equipment can also include security piece of information SEC, for example a bit, indicating, depending on the logical value of the bit, whether this master piece of equipment is configured in secure mode or not.

The set of configuration pieces of information for a master piece of equipment may also include a privileged piece of information PRV, for example a bit, indicating according to the logical value of the bit whether this master piece of equipment is configured in privileged mode or not.

This privileged piece of information may include several bits if several levels of privileged modes are provided. Finally, provision can be made for a locking piece of information LKM, for example one or more bits, which, depending on the logical value of the bit(s), indicate whether at least one of the configuration pieces of information, for example the configuration pieces of information SEC and PRV, or else the identification piece of information CID, can be modified or not.

It is also possible to provide one or more locking bits allowing to lock the content of the manager register RGG designating the identification piece of information of the master manager piece of equipment.

These configuration pieces of information associated with the master piece of equipment are stored (step 120) in the corresponding set of configuration register RGCMi.

With regard to a slave resource, the set of configuration pieces of information associated therewith can comprise, for example, an inaccessibility piece of information INAC, for example a bit, intended to indicate, according to the logical value of the bit, that this slave resource is inaccessible by any master piece of equipment.

The configuration diagram SCH further comprises, for a non-inaccessible slave resource, a filtering piece of information IFLT, for example a bit, intended to indicate, based only on the identification pieces of information CID of the master pieces of equipment, whether this slave resource can be accessed by any master piece of equipment or by only one or more master pieces of equipment.

Thus, for example, if the filtering piece of information has the logical value "o", this means that there is no filtering applied to the identification pieces of information and that consequently, a slave resource can be accessed by any master piece of equipment, subject to any other access restrictions that will be seen in more detail below.

In fact, these sets of configuration pieces of information allow to assign at least one piece of master equipment to a slave resource.

It should be noted that several master pieces of equipment can have the same identification piece of information CID.

This is the case, for example, when these master pieces of equipment include a microprocessor and one or more master pieces of equipment controllable by this microprocessor. In this case, a compartment designated by the identification piece of information CID is formed.

All the master pieces of equipment of this compartment can then have for example access to the same memory resources.

It is also possible that a master piece of equipment controlled by a microprocessor, for security reasons, does not have the same identification piece of information as the microprocessor. This is for example the case for a piece of equipment of the PCI-E type. In this case, this allows to limit access to some memory resources of this PCI-E type master piece of equipment.

The set of configuration pieces of information defining the configuration diagram may further comprise, for the non-accessible slave resource, a first access piece of information IAC1 intended to indicate, in the case where the filtering piece of information IFLT (IFLT=1 for example) indicates that the considered slave resource can be accessed by only one or more master pieces of equipment, that this slave resource can be accessed by one or more master pieces of equipment having the same identification piece of information CID.

In this case, of course, the set of configuration pieces of information includes this corresponding identification piece of information CID.

As indicated above, this identification piece of information CID can relate to a single master piece of equipment or to several master pieces of equipment in the same compartment.

The set of configuration pieces of information defining the configuration diagram SHC can further comprise for this non-accessible slave resource, a second access piece of information IAC2 intended to indicate, in the case where the filtering piece of information IFLT (IFLT=1) indicates that the slave resource can be accessed by only one or more master pieces of equipment, that this slave resource can be accessed by master pieces of equipment having different identification pieces of information CID. And, in this case, the set of configuration pieces of information of this slave resource includes the list CID1 . . . CID4, for example, of identification pieces of information of the corresponding master pieces of equipment.

Such a slave resource which can be accessed by several master pieces of equipment sequentially or simultaneously, can for example be a memory means.

On the other hand, it is possible for this slave resource which can be accessed by the master pieces of equipment of the list, that the set of configuration pieces of information comprises a third piece of information IAC3 intended to indicate that this slave resource can only be accessed by one master piece of equipment at a time, the master piece of equipment wishing to access this slave resource being configured to use a semaphore SMP.

This is the case, for example, when a slave resource can be accessed by two microprocessors. Only the microprocessor that takes the semaphore can access this slave resource and until the microprocessor has released the semaphore, the other microprocessor cannot access it. It will only be able to access it when it has taken in turn the semaphore SMP.

The set of configuration pieces of information defining the configuration diagram SCH for this slave resource can also comprise security piece of information ISEC, for example a bit, intended to indicate whether this slave resource is accessible by a secure master piece of equipment or not.

Likewise, the set of configuration pieces of information may include a privileged piece of information for this slave resource, for example a bit, IPRV, intended to indicate whether this slave resource is accessible by a master piece of equipment in privileged mode or not.

And, here again, it is also possible to use a locking piece of information LKS intended to indicate whether the configuration pieces of information of this slave resource can be modified or not.

All these configuration pieces of information assigned to a slave resource are stored (step 121) in the set of corresponding configuration registers RGCSi.

It should be noted here that the first master manager piece of equipment, for example the microprocessor CPU1, is configured to be in secure mode and in privileged mode at the end of its boot phase.

As indicated above, the allocation means allowing to implement the configuration diagram, particularly the initial configuration diagram, include the sets of configuration registers assigned to each slave resource and to each master piece of equipment as well as the configuration controller RIFC configured to update the contents of the sets of configuration registers with the set of configuration pieces of information under the control of the first master manager piece of equipment.

This is schematically illustrated in FIG. 13.

More specifically, the master manager piece of equipment CPU1 controls (step 130) an update of the configuration diagram SCH which is performed by the configuration controller RIFC which updates the contents of the sets of registers RGCMi and RGCSi (step 131).

And, only the master piece of equipment which has the quality of master manager piece of equipment is configured to modify a configuration diagram.

Reference is now made more particularly to FIG. 14 to describe an example of the content of a transaction TR.

Generally, here, each transaction TR emitted by a master piece of equipment comprises an addressing field ADR whose content is intended to address the slave resource receiving this transaction.

But the content of the addressing field ADR does not belong to the set of configuration pieces of information.

In other words, the content of the addressing field is not used alone or in combination, to define the assignments of the master pieces of equipment to the slave resources.

More specifically, as illustrated in FIG. 14, each transaction TR includes the identification piece of information CID of the master piece of equipment emitting this transaction, the security piece of information SEC, an indication EXE intended to indicate whether or not this transaction contains an execution instruction, the privileged piece of information PRV, a piece of information RW indicating whether it is a read or write transaction, the addressing field ADR and a data field DATA.

The processing means of the system on chip include addition means configured to add to each transaction emitted by a master piece of equipment at least the identification piece of information of this master piece of equipment CID, this identification piece of information not belonging to the addressing field ADR of the transaction.

The addition means are further configured to add the security piece of information SEC and/or the privileged piece of information to each transaction emitted by a master piece of equipment if these two pieces of information do not already appear in the transaction emitted by the master piece of equipment.

As illustrated in FIG. 15, these addition means include for each master piece of equipment EMi, the associated elementary management unit RIMUi which is linked to the set of corresponding configuration registers RGCMi by the specific link LDMi.

Thus, the elementary management unit RIMUi completes the initial transaction TRI emitted by the master piece of equipment EMi by adding (step 150) the identification piece of information CID and optionally the pieces of information SEC and PRV thereto, the complete transaction TR then being supplied on the bus linked to the interconnection circuit INTC.

Materially, this elementary management unit RIMUi can comprise a logic circuit.

The processing means MT can also include verification means configured to verify whether a transaction TR emanating from a master piece of equipment and intended for a slave resource is authorized to access this slave resource using at least the configuration piece of information attached to the transaction, and in general at least some of the other configuration pieces of information of the set of configuration pieces of information assigned to this slave resource.

More specifically, as illustrated in FIG. 16, the verification means are configured to perform the verification downstream of the interconnection circuit INTC and these verification means include for each slave resource the elementary verification module RISUi which is configured to access the set of configuration pieces of information assigned to this slave resource and stored in the set of corresponding configuration registers RGCSi, via the specific link LDSi.

The access authorization verification is performed in step 160.

This verification allows to define whether in step 161 the access to the transaction TR intended for the slave resource RSSi is authorized or not.

This is for example the case if the filtering indication IFLT is enabled and the slave resource can only be accessed by one or more master pieces of equipment having the same identification piece of information, and the identification piece of information contained in the transaction TR does not correspond to the identification piece of information stored in the set of registers RGCSi.

The verification means then determine whether the denied transaction is a read transaction (step 163).

If this is the case, the elementary management unit RISUi returns to the master piece of equipment EMi emitting the denied transaction (step 164) an indication of access denial IR, for example a 0.

In parallel, the elementary verification module RISUi returns (step 165) to the master manager piece of equipment EMG an illegal access notification NIAC containing an identifier IDRSSi of the slave resource RSSi, the identification piece of information CIDi of the master piece of equipment EMI at the origin of this denied transaction, as well as the transaction type (here the read type).

If the denied transaction is a write transaction, then this transaction is purely and simply ignored (step 167) but the elementary verification module RISUi still returns to the master manager piece of equipment EMG the illegal access notification containing here again the identifier IDRSSi, the identification piece of information CIDi of the master piece of equipment EMI at the origin of the denied transaction and the type of the denied transaction, here the write type.

Structurally, an elementary verification module RISU can include a logic circuit.

It was seen previously that only the master manager piece of equipment can send a transaction to the configuration controller, for example to update configuration registers.

In this regard, it is therefore necessary to verify that a transaction arriving at the configuration controller is indeed emitted by the master manager piece of equipment.

This is the role of an auxiliary verification module RISUC assigned to the configuration controller RIFC (FIG. 17).

In this regard, when a transaction TRC, in particular containing the identification piece of information CID of the master piece of equipment at the origin of this transaction TRC, is provided (step 170) to the auxiliary verification module RISUC, the latter, connected to the manager register RGG containing the identification piece of information CID of the current manager piece of equipment, for example the microprocessor CPU1, verifies that the identification piece of information CID contained in the transaction TRC indeed corresponds to the identification piece of information CID1 (step 171).

If this is not the case, the access to the controller RIFC is denied (step 173).

On the other hand, if there is a match between the two identification pieces of information, then the transaction TRC is indeed provided to the configuration controller RIFC (step 172).

It was seen previously that from the master pieces of equipment, it is possible that there is at least one piece of master equipment having a slave port and a master port.

This is the case for example for the master piece of equipment LMk (FIG. 18) having an input port PE (slave port) and an output port PS (master port).

Such a master piece of equipment can for example be a USB controller which is controllable by a microprocessor but which can also be controllable during the execution of the user program, by another microprocessor.

The slave port PE is associated with an elementary verification module RISUk connected to the corresponding set of configuration registers RGCSk and the master port PS is associated with an elementary management unit RIMUk connected to the corresponding set of configuration registers RGCMk but also to the set of configuration registers RGCSk.

It is initially assumed that this master piece of equipment LMk is controlled by the microprocessor CPU1.

In this case, the set of configuration registers RGCSk to which the elementary verification module RISUk is linked contains the identification piece of information CID1 of the microprocessor 1 as well as the privileged and security pieces of information corresponding to those of the microprocessor CPU1.

The set of registers RGCMk also includes the identification piece of information CID1 of the microprocessor CPU1 as well as the corresponding security and privileged pieces of information.

The processing means then include inheritance means MINH (FIG. 18) configured, upon control and by taking into account inheritance rules, to replace at least some of the configuration pieces of information assigned to the master port with the homologous configuration pieces of information assigned to the slave port or else to keep the configuration pieces of information assigned to the master port.

More specifically, these inheritance means MINH include a set of controllable switches SW, produced for example in hardware form, selectively connected to the set of registers RGMk and to the set of registers RGCSk.

The inheritance means MINH also include MCM control means, for example produced in software form within the microprocessor CPU1, and capable of emitting a control signal CSP intended to control the switch set SW taking into account the inheritance rules.

As long as the master piece of equipment LMk is controlled by the microprocessor CPU1, the control means MCM place the switch SW in position A so as to add to the transaction emitted by the master port PS, the identification piece of information CID1 as well as the corresponding privileged and security pieces of information.

On the other hand, if at a given instant there is a modification of the configuration diagram so that it is for example the microprocessor CPU2 which must take control of the master piece of equipment LMk, then, there is on the one hand, an update of the set of configuration registers RGCSk with the new identification piece of information CID2 of the microprocessor CPU2 and with the corresponding privileged and security pieces of information and, on the other hand, a switching of the switch SW to position B so that, automatically, the identification piece of information CID2 of the microprocessor CPU2 and the corresponding security and privileged pieces of information are attached to the transaction emitted by the master port PS on the interconnection circuit INTC.

In other words, without it being necessary to perform a complete reprogramming of the system on chip, there is an automatic inheritance by a simple switching, of the new pieces of information assigned to the slave port towards the master port.

Reference is now made more particularly to FIGS. 19 to 22, to describe in more detail examples of system on chip debugging.

As indicated above the test access port DAP is assigned to an elementary management unit RIMUDAP, having a structure similar to that of the other units RIMUi (FIG. 19). This unit RIMUDAP, like the other units RIMUi, can be produced by a logic circuit.

In the example described here, an inheritance structure, similar to that described with reference to FIG. 18, is implemented.

More specifically, the unit RIMUDAP can be selectively connected either to the set of configuration registers RGCM1 associated with the microprocessor CPU1, or to the set of configuration registers RGCM2 associated with the microprocessor CPU2, or to the centralized register RGCCTR, or to another register RGND intended for example to contain a bit.

If this bit is for example equal to zero, this means that no debugging is possible. In this case, the unit RIMUDAP prohibits, for example, any connection with the interconnection circuit INTC.

If on the other hand this bit is equal to 1, then a debugging is possible.

If the unit RIMUDAP is linked to the set of registers RGCM1, the test access port DAP will inherit the configuration pieces of information from the microprocessor CPU1, in particular its identification piece of information CID1, and its privileged and security pieces of information. And any transaction emitted by the test port will contain these pieces of information.

If the unit RIMUDAP is linked to the set of registers RGCM2, the test access port DAP will inherit the configuration pieces of information from the microprocessor CPU2, in particular its identification piece of information CID2, and its privileged and security pieces of information. And any transaction emitted by the test port will contain these pieces of information.

If the unit RIMUDAP is linked to the centralized register RGCCTR, the test access port DAP will inherit the particular identification piece of information DDCID, which will be attached to any transaction by the unit RIMUDAP, so as to allow a global debugging of the system on chip MCU.

The choice between these registers is conditioned for example by a switch controlled by the configuration controller RIFC under the control of the master manager piece of equipment which is here the microprocessor CPU1.

And this choice is advantageously, but not exclusively, performed when booting the system on chip.

As for the elementary verification units RISUi respectively assigned to the slave resources RSSi, they are not only connected respectively to the sets of configuration registers RGCSi respectively assigned to these slave resources RSSi but also to the centralized register RGCCTR.

Reference is now made more specifically to FIG. 20, which illustrates a debugging of the microprocessor CPU1. In this regard, the external debugging tool DBT will access, via the test access port, the slave resources assigned to the microprocessor CPU1.

In step 2000, the microprocessor CPU1 is selected by the configuration controller RIFC under the control of the master manager piece of equipment which is also here, the microprocessor CPU1.

The unit RIMUDAP is therefore linked to the configuration registers RGCM1, so as to allow the inheritance of the identification piece of information CID1, of the privileged piece of information PRV and of the security piece of information SEC of the microprocessor CPU1, which will be attached to any transaction TR emitted by the test access port upon control of the debugging tool DBT.

This is performed in step 2001, the identification piece of information CIDDAP of the test access port being therefore equal to CID1.

When the transaction TR, intended for the slave resource RSSi (step 2002) reaches the elementary verification unit RISUi associated with this slave resource, this unit RISUi verifies, by its connection to the set of configuration registers RGCSi, whether the slave resource RSSi is indeed assigned to the microprocessor CPU1 (step 2003).

If this is the case, the transaction TR is provided to the slave resource RSSi (step 2004).

Otherwise (step 2005), the access is denied with, for example, the consequences set out in steps 163 to 167 of FIG. 16.

In the case where the two microprocessors CPU1 and CPU2 are selected (step 2100, FIG. 21) for a global debugging of the system on chip, the unit RIMUDAP is linked to the centralized register RGCCTR, the identification piece of information CIDDAP of the test access port DAP being then equal to the particular identification piece of information DDCID.

Any transaction TR containing this particular identification piece of information DDCID and intended for a slave resource RSSi (step 2102) is then provided to this slave resource (step 2103) regardless of this slave resource.

It should be noted here that, in general, a transaction containing this particular identification piece of information DDCID allows access to a resource protected by semaphore, without taking the latter and even if the latter is taken by one of the microprocessors.

For example, if a resource is shared between the microprocessor CPU1 and the microprocessor CPU2, via a semaphore, then if none of the microprocessors has taken the semaphore, the transaction can still access the resource without the external debugging tool DBT having to take a semaphore via the test access port.

If the microprocessor CPU1 has taken the semaphore, the external debugging tool DBT can access the resource with the transaction containing the particular identification piece of information DDCID without taking the semaphore and without the microprocessor CPU1 having to release it.

As indicated above and illustrated more particularly in FIG. 22, it is possible to prohibit any debugging, for example by setting to 0 the bit contained in the register RGND.

The unit RIMUDAP verifies the value of this bit in step 2200.

If this bit is set to 0, the unit RIMUDAP prohibits any connection of the test access port DAP with the interconnection circuit.

If this bit is set to 1, then debugging is possible, either selective or global as indicated above.

Example 1: A system on a chip, comprising several master pieces of equipment including several microprocessors, several slave resources, an interconnection circuit (INTC) coupled between the master pieces of equipment and the slave resources and capable of routing transactions between master pieces of equipment and slave resources, and processing means (MT) at least configured to allow a user of the system on a chip to implement within the system on a chip (MCU) at least one configuration diagram (SCH) of this system defined by a set of configuration pieces of information used to define an assignment of at least one piece of master equipment to at least some of the slave resources, and the processing means being further configured to select at least one of the microprocessors and authorize an external debugging tool (DBT) to access, for debugging purposes, only to the slave resources assigned to said at least one selected microprocessor.

Example 2: The system on a chip according to example 1, wherein the processing means (MT) are further configured to prohibit the debugging tool (DBT) from accessing the slave resources.

Example 3: The system on a chip according to example 1 or 2, wherein the master pieces of equipment comprise a test access port (DAP) intended to be coupled to said external debugging tool, said set of configuration pieces of information including at least one identification piece of information (CID) assigned to each master piece of equipment. These identification pieces of information being intended to be attached to all the transactions (TR) emitted by the corresponding master pieces of equipment, this test access port being assigned an identification piece of information, called test identification piece of information, (CIDDAP) which is modifiable, representative of said at least one selected microprocessor, and any slave resource assigned to said at least one selected microprocessor, is configured to accept receiving a transaction including this test identification piece of information.

Example 4: The system on a chip according to example 3, wherein if a single microprocessor (CPU1) is selected, said test identification piece of information (CIDDAP) is the identification piece of information (CID1) of the selected microprocessor.

Example 5: The system on a chip according to example 3 or 4, wherein if several microprocessors are selected, said test identification piece of information is a particular identification piece of information (DDCID) different from the identification pieces of information of the selected microprocessors and is configured to designate these selected microprocessors.

Example 6: The system on a chip according to one of the preceding examples, comprising, a set of configuration registers assigned to each slave resource and to each master piece of equipment, the set of configuration registers assigned to a slave resource being intended to store the various configuration pieces of information assigned to this slave resource, the set of configuration registers assigned to a master piece of equipment being intended to store the various configuration pieces of information assigned to this master piece of equipment and a configuration controller (RIFC) configured to update the contents of the sets of configuration registers with said set of configuration pieces of information under the control of a first master piece of equipment called master manager piece of equipment.

Example 7: The system on a chip according to examples 4 and 6, wherein the set of configuration registers assigned to the test access port (DAP) is that of the selected microprocessor.

Example 8: The system on a chip according to examples 5 and 6, further comprising a centralized register (RGCCTR) intended to contain said particular identification piece of information.

Example 9: The system on a chip according to example 6 and 8, wherein the configuration controller is also configured to update the content of the centralized register (RGCCTR) under the control of the first master piece of equipment called master manager piece of equipment.

Example 10: The system on a chip according to example 8 or 9, wherein the set of configuration registers assigned to the test access port comprises the centralized register (RGCCTR).

Example 11: The system on a chip according to one of the preceding examples, wherein a slave resource belongs to the group formed at least by a peripheral (PH3), a feature (PH60) of a peripheral (PH6), a memory means (IMM1) internal to the system on a chip, a memory interface (INTM2) internal to the system on a chip and intended to be coupled to a memory means (EXMM) external to the system on a chip.

Example 12: The system on a chip according to one of the preceding example, wherein at least one piece of master equipment (LMk) controllable by a microprocessor includes an output port (PS) capable of emitting transactions as well as an input port (PE) capable of receiving transactions, said input port being considered as a slave resource and the output port as a master piece of equipment.

Example 13: The system on a chip according to one of the preceding examples, wherein the set of configuration pieces of information of the configuration diagram comprises, for at least one slave resource, an inaccessibility piece of information (INAC) intended to indicate that this slave resource is inaccessible by any master piece of equipment.

Example 14 The system on a chip according to one of the preceding examples, wherein the set of configuration pieces of information defining the configuration diagram comprises for each non-inaccessible slave resource, a filtering piece of information (IFLT) intended to indicate whether this slave resource can be accessed by any master piece of equipment or by only one or more master pieces of equipment.

Example 15: The system on a chip according to examples 3 and 14, wherein the set of configuration pieces of information defining the configuration diagram further comprises for each non-inaccessible slave resource, a first access piece of information (IAC1) intended to indicate, in the case where the filtering piece of information indicates that the slave resource can be accessed by only one or more master pieces of equipment, that this slave resource can be accessed by one or more master pieces of equipment having the same identification piece of information, and the corresponding identification piece of information (CID).

Example 16: The system on a chip according to examples 3 and 14, wherein the set of configuration pieces of information defining the configuration diagram further comprises for each non-inaccessible slave resource, a second access piece of information (IAC2) intended to indicate, in the case where the filtering piece of information indicates that the slave resource can be accessed by only one or more master pieces of equipment, that this slave resource can be accessed by master pieces of equipment having different identification pieces of information, and the list (CID1 . . . CID4) of identification pieces of information of the corresponding master pieces of equipment.

Example 17: The system on a chip according to example 16, wherein the set of configuration pieces of information defining the configuration diagram further comprises for at least one of the slave resources that can be accessed by the master pieces of equipment of said list, a third piece of information (IAC3) intended to indicate the at least one of said slave resources can only be accessed by one master piece of equipment at a time, the master piece of equipment wishing to access this slave resource being configured to use a semaphore.

Example 18: The system on a chip according to one of the preceding examples wherein the set of configuration pieces of information defining the configuration diagram comprises for each non-inaccessible slave resource, a security piece of information (ISEC) intended to indicate whether this slave resource is accessible by a master piece of equipment in secure mode or not.

Example 19: The system on a chip according to one of the preceding examples, wherein the set of configuration pieces of information defining the configuration diagram comprises, for each non-inaccessible slave resource, a privileged piece of information (IPRV) intended to indicate whether this slave resource is accessible by a master piece of equipment in privileged mode or not.

Example 20: The system on a chip according to one of the preceding examples as combined with example 3, wherein the set of configuration pieces of information defining the configuration diagram comprises for each master piece of equipment, in addition to its identification piece of information (CID), a security piece of information (SEC) intended to indicate whether this master piece of equipment is configured in secure mode or not.

Example 21: The system on a chip according to one of the preceding example as combined with example 3, wherein the set of configuration pieces of information defining the configuration diagram comprises for each master piece of equipment, in addition to its identification piece of information, a privileged piece of information (PRV) intended to indicate whether this master piece of equipment is configured in privileged mode or not.

Example 22: The system on a chip according to examples 6, 20 and 21, wherein the first master manager piece of equipment (EMG) is configured to be in secure mode and in privileged mode at the end of its boot phase.

Example 23: The system on a chip according to one of the preceding examples, wherein the set of configuration pieces of information defining the configuration diagram comprises, for at least some of the slave resources and at least some of the master pieces of equipment, a locking piece of information (LKM, LKS) intended to indicate whether their configuration pieces of information can be modified or not.

Example 24: The system on a chip according to one of the preceding examples, wherein each transaction (TR) emitted by a master piece of equipment comprises an addressing field (ADR) whose content is intended to address the slave resource receiving this transaction, and the content of the addressing field does not belong to said set of configuration pieces of information.

Example 25: The system on a chip according to one of the preceding examples as combined with example 3, wherein each transaction (TR) emitted by a master piece of equipment comprises an addressing field whose content is intended to address the slave resource receiving this transaction, and the processing means (MT) further include addition means configured to add to each transaction emitted by a master piece of equipment, at least the identification piece of information (CID) of this master piece of equipment, said identification piece of information not belonging to the addressing field of the transaction.

Example 26: The system on a chip according to example 25 as combined with example 20 or 21, wherein the addition means are further configured to add to each transaction emitted by a master piece of equipment, the security piece of information (SEC) and/or the privileged piece of information (PRV) if these two pieces of information or one of these two pieces of information do not already appear in the transaction emitted by the master piece of equipment.

Example 27: The system on a chip according to one of example 25 or 26, wherein the addition means include for each master piece of equipment, an elementary management unit (RIMUi) configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Example 28: The system on a chip according to example 6 and 27, wherein each elementary management unit (RIMUi) assigned to a master piece of equipment is connected by a dedicated link (LDMi) at least to the set of configuration registers (RGCMi) assigned to this master piece of equipment.

Example 29: The system on a chip according to one of the preceding examples, wherein at least one configuration piece of information is intended to be attached to each transaction, and the processing means (MT) include verification means configured to verify whether a transaction emanating from a master piece of equipment and intended for a slave resource is authorized to access this slave resource, using said at least one configuration piece of information attached to said transaction.

Example 30: The system on a chip according to example 29, wherein the verification means are configured to verify whether a transaction emanating from the test access port and intended for a slave resource is authorized to access this slave resource, using at least said test identification piece of information (CID) attached to said transaction.

Example 31: The system on a chip according to example 30 as combined with examples 20 and 21, wherein the verification means are configured to verify whether a transaction emanating from test access port and intended for a slave resource is authorized to access this slave resource, also using at least said security piece of information (SEC) and said privileged piece of information (PRV) attached to said transaction.

Example 32: The system on a chip according to one of examples 29 to 31, wherein the verification means are configured to perform said verification downstream of the interconnection circuit (INTC).

Example 33: The system on a chip according to one of examples 29 to 32 as combined with example 5, wherein the verification means include for each slave resource, an elementary verification module (RISUi) configured to access the set of configuration pieces of information assigned to this slave resource as well as said particular identification piece of information.

Example 34: The system on a chip according to examples 8 and 33, wherein each elementary verification module (RISUi) assigned to a slave resource is connected by a dedicated link (LDSi) to the set of configuration registers (RGCSi) assigned to this slave resource as well as to the centralized register.

Example 35: The system on a chip according to one of the preceding examples, forming a microcontroller (MCU).

Example 36: A method for managing the operation of a system on a chip, the system on a chip comprising several master pieces of equipment including several microprocessors (CPU1, CPU2), several slave resources, an interconnection circuit coupled between the master pieces of equipment and the slave resources and capable of routing transactions between master pieces of equipment and slave resources, the method comprising a configuration phase (PHCFG) including defining at least one configuration diagram by a set of configuration pieces of information allowing to define an assignment of at least one piece of master equipment to at least some of the slave resources, and implementing within the system on a chip said at least one configuration diagram, a selection of at least one microprocessor and authorization, for an external debugging tool (DBT), to access, for debugging purposes, only to the slave resources assigned to said at least one selected microprocessor, or else a prohibition for the debugging tool, from accessing any slave resource.

Example 37: The method according to example 36, wherein the master pieces of equipment include a test access port coupled to the external debugging tool, said set of configuration pieces of information includes at least one identification piece of information (CID) assigned to each master piece of equipment, the method also including assigning to said test access port an identification piece of information, called test identification piece of information (CIDDAP), which is modifiable, and which is representative of said at least one selected microprocessor, and the method further comprising adding at least this identification pieces of information to all the transactions emitted by the corresponding master pieces of equipment, and any slave resource assigned to said at least one selected microprocessor accepts receiving any transaction including this test identification piece of information.

Example 38: The method according to example 37, wherein if a single microprocessor is selected, said test identification piece of information (CIDDAP) is the identification piece of information (CID1) of the selected microprocessor.

Example 39: The method according to example 37, wherein if several microprocessors are selected, said test identification piece of information is a particular identification piece of information (DDCID) different from the identification pieces of information of the selected microprocessors and configured to designate these selected microprocessors.

Example 40: The method according to one of examples 36 to 39, wherein a slave resource belongs to the group formed at least of a peripheral (PH3), a feature (PH60, PH61) of a peripheral (PH6), a memory means internal to the system on a chip, a memory interface internal to the system on a chip and intended to be coupled to a memory means external to the system on a chip.

Example 41: The method according to one of examples 36 to 40, comprising updating the configuration pieces of information assigned to each slave resource and to each master piece of equipment, under the control of a first master piece of equipment called master manager piece of equipment (EMG).

Example 42: The method according to one of examples 36 to 41, wherein the set of configuration pieces of information defining the configuration diagram comprises for each non-inaccessible slave resource, a security piece of information (ISEC) indicating whether this slave resource is accessible by a master piece of equipment in secure mode or not.

Example 43: The method according to one of examples 36 to 42, wherein the set of configuration pieces of information defining the configuration diagram comprises for each non-inaccessible slave resource, a privileged piece of information (IPRV) indicating whether this slave resource is accessible by a master piece of equipment in privileged mode or not.

Example 44: The method according to one of examples 36 to 43 as combined with example 37, wherein the set of configuration pieces of information defining the configuration diagram comprises for each master piece of equipment, in addition to its identification piece of information, a security piece of information (SEC) indicating whether this master piece of equipment is configured in secure mode or not.

Example 45: The method according to one of examples 36 to 44 as combined with example 37, wherein the set of configuration pieces of information defining the configuration diagram further comprises for each master piece of equipment, in addition to its identification piece of information, a privileged piece of information (PRV) indicating whether this master piece of equipment is configured in privileged mode or not.

Example 46: The method according to examples 41, 44 and 45, comprising a configuration of the first master manager piece of equipment (CPU1) in secure mode and in privileged mode at the end of its boot phase.

Example 47: The method according to one of examples 36 to 46 as combined with example 37, wherein each transaction (TR) emitted by a master piece of equipment comprises an addressing field whose content addresses the slave resource receiving this transaction, and the content of the addressing field does not belong to said set of configuration pieces of information.

Example 48: The method according to one of examples 36 to 47 as combined with example 37, wherein each transaction (TR) emitted by a master piece of equipment comprises an addressing field whose content addresses the slave resource receiving this transaction, and the method comprises adding to each transaction emitted by a master piece of equipment, at least the identification piece of information of this master piece of equipment, said identification piece of information not belonging to the addressing field of the transaction.

Example 49: The method according to example 48 as combined with example 44 or 45, comprising adding to each transaction emitted by a master piece of equipment, the security piece of information and/or the privileged piece of information if these two pieces of information or one of these two pieces of information do not already appear in the transaction emitted by the master piece of equipment.

Example 50: The method according to one of examples 36 to 49 as combined with example 37, wherein at least one configuration piece of information is attached to each transaction, and the method comprises verifying whether a transaction emanating from the test access port and intended for a slave resource is authorized to access this slave resource, said verification including using said at least one test identification piece of information (CIDDAP) attached to said transaction.

Example 51: The method according to example 50 as combined with examples 44 and 45, wherein said verification comprises using at least said security piece of information (SEC) and said privileged piece of information (PRV) attached to said transaction.

Example 52: The method according to one of examples 50 to 51, wherein said verification is performed downstream of the interconnection circuit (INTC).

Example 53: The method according to one of examples 50 to 52 as combined with example 37, wherein said verification comprises local verifications (RISUi) performed at the slave resources from the configuration pieces of information respectively assigned to these slave resources and from said particular identification piece of information (DDCID).

Example 54: The method according to one of example 36 to 53, wherein the system on a chip forms a microcontroller (MCU).

It should be noted that the French patent application filed, on behalf of the companies STMicroelectronics (Alps) SAS and STMicroelectronics (Grand Ouest) SAS, on the same day as the present application with the title "Method for managing the operation of a system on chip forming for example a microcontroller, and corresponding system on chip," and the French patent application filed, on behalf of the companies STMicroelectronics (Alps) SAS, STMicroelectronics (Grand Ouest) SAS and STMICROELECTRONICS (ROUSSET) SAS, on the same day as the present application with the title "Method for managing the configuration of access to peripherals and their associated resources of a system on chip forming for example a microcontroller, and corresponding system on chip" are incorporated herein by reference in their entirety.

What is claimed is:

1. A system on chip comprising: a plurality of microprocessors; a plurality of slave resources; an interconnection circuit coupled between the microprocessors and the slave resources, the interconnection circuit configured to route transactions between the microprocessors and the slave resources; and a processing controller configured to: allow a user of the system to implement within the system, at least one configuration diagram of the system defined by a set of configuration pieces of information used to define an assignment of at least one microprocessor to at least some of the slave resources, attach at least one configuration piece of information to each transaction, select the at least one microprocessor, and authorize an external debugging tool to access, for debugging purposes, only the slave resources assigned to the at least one microprocessor; wherein the processing controller comprises a verification logic circuit configured to: verify whether a first transaction emanating from the plurality of microprocessors and intended for a first slave resource is authorized to access the first slave resource, using the at least one configuration piece of information attached to the first transaction, and verify whether a second transaction emanating from a test access port and intended for a second slave resource is authorized to access the second slave resource, using at least a test identification piece of information attached to the second transaction.

2. The system according to claim 1, wherein the processing controller is further configured to prohibit the external debugging tool from accessing any other the slave resources while the external debugging tool is accessing the slave resources assigned to the at least one microprocessor.

3. The system according to claim 1, wherein each microprocessor comprises an individual test access port configured to be coupled to the external debugging tool, wherein the set of configuration pieces of information include at least one identification piece of information assigned to each microprocessor, wherein each identification piece of information is configured to be attached to all the transactions emitted by the corresponding microprocessor, wherein the individual test access port is assigned the test identification piece of information, which is modifiable and representative of the selected microprocessor, and wherein the slave resources assigned to the selected microprocessor are configured to a receive the second transaction including the test identification piece of information.

4. The system according to claim 3, wherein the test identification piece of information is an identification piece of information of the selected microprocessor when the microprocessor is selected.

5. The system according to claim 3, wherein the test identification piece of information is a particular identification piece of information different from each identification piece of information assigned to each selected microprocessor when several microprocessors are selected, and wherein the test identification piece of information is configured to designate the selected microprocessors.

6. The system according to claim 1, further comprising:
a set of configuration registers assigned to each slave resource and to each microprocessor, wherein the set of configuration registers assigned to a specific slave resource is configured to store various configuration pieces of information assigned to the specific slave resource, wherein the set of configuration registers assigned to a specific microprocessor is configured to store various configuration pieces of information assigned to the specific microprocessor; and
a configuration controller configured to update contents of each set of configuration registers with the set of configuration pieces of information under control of a master manager microprocessor.

7. The system according to claim 6, wherein the processing controller is further configured to prohibit the external debugging tool from accessing any other the slave resources while the external debugging tool is accessing the slave resources assigned to the at least one microprocessor.

8. The system according to claim 6, wherein each microprocessor comprises an individual test access port configured to be coupled to the external debugging tool, wherein the set of configuration pieces of information include at least one identification piece of information assigned to each microprocessor, wherein each identification piece of information is configured to be attached to all the transactions emitted by the corresponding microprocessor, wherein the individual test access port is assigned the test identification piece of information, which is modifiable and representative of the selected microprocessor, and wherein the slave resources assigned to the selected microprocessor are configured to a receive the second transaction including the test identification piece of information.

9. The system according to claim 6, wherein the verification logic circuit is configured to verify whether the second transaction emanating from the test access port and intended for the second slave resource is authorized to access the second slave resource, using at least a security piece of information and a privileged piece of information attached to the second transaction.

10. The system according to claim 9, wherein the verification logic circuit is configured to perform verification downstream of the interconnection circuit.

11. The system according to claim 10, wherein the verification logic circuit includes, for each slave resource, an elementary verification module configured to access the set of configuration pieces of information assigned to the respective slave resource as well as a particular identification piece of information.

12. The system according to claim 6, wherein a selected set of configuration registers assigned to the test access port is the set of configuration registers assigned to a selected microprocessor.

13. The system according to claim 12, further comprising a centralized register configured to contain particular identification piece of information.

14. The system according to claim 13, wherein the configuration controller is also configured to update a content of the centralized register under control of the master manager microprocessor.

15. The system according to claim 13, wherein the set of configuration registers assigned to the test access port comprises the centralized register.

16. The system according to claim 1, wherein the verification logic circuit is configured to verify whether the second transaction emanating from the test access port and intended for the second slave resource is authorized to access the second slave resource, using at least a security piece of information and a privileged piece of information attached to the second transaction.

17. The system according to claim 16, wherein the verification logic circuit is configured to perform verification downstream of the interconnection circuit.

18. The system according to claim 17, wherein the verification logic circuit includes, for each slave resource, an elementary verification module configured to access the set of configuration pieces of information assigned to the respective slave resource as well as a particular identification piece of information.

19. The system according to claim 18, wherein each elementary verification module assigned to each slave resource is connected by a dedicated link to a set of configuration registers assigned to the respective slave resource as well as to a centralized register.

20. The system according to claim 1, wherein the system is a microcontroller.

* * * * *